United States Patent
Park et al.

(10) Patent No.: US 12,218,726 B2
(45) Date of Patent: Feb. 4, 2025

(54) METHOD AND APPARATUS FOR CONFIGURING TERMINAL ANTENNA IN WIRELESS COMMUNICATION SYSTEM

(71) Applicant: Samsung Electronics Co., Ltd., Suwon-si (KR)

(72) Inventors: Jinhyun Park, Suwon-si (KR); Hoondong Noh, Suwon-si (KR); Youngwoo Kwak, Suwon-si (KR); Younsun Kim, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 523 days.

(21) Appl. No.: 17/250,772

(22) PCT Filed: Sep. 3, 2019

(86) PCT No.: PCT/KR2019/011340
§ 371 (c)(1),
(2) Date: Mar. 2, 2021

(87) PCT Pub. No.: WO2020/050594
PCT Pub. Date: Mar. 12, 2020

(65) Prior Publication Data
US 2021/0218455 A1 Jul. 15, 2021

(30) Foreign Application Priority Data

Sep. 3, 2018 (KR) .................. 10-2018-0104697
Nov. 9, 2018 (KR) .................. 10-2018-0137604

(51) Int. Cl.
*H04B 7/06* (2006.01)
*H04L 5/00* (2006.01)
(Continued)

(52) U.S. Cl.
CPC ......... *H04B 7/0626* (2013.01); *H04L 5/0048* (2013.01); *H04W 24/08* (2013.01); *H04W 72/0453* (2013.01); *H04W 72/20* (2023.01)

(58) Field of Classification Search
CPC .... H04B 7/0626; H04W 72/20; H04W 24/08; H04W 72/0453; H04L 5/0048
See application file for complete search history.

(56) References Cited

U.S. PATENT DOCUMENTS 9,484,998 B2 11/2016 Kim et al.
9,655,097 B2 5/2017 Papasakellariou et al.
(Continued)

FOREIGN PATENT DOCUMENTS

CN 101436892 A 5/2009
CN 103179078 A 6/2013
(Continued)

OTHER PUBLICATIONS

Qualcomm Incorporated, 3GPP TSG RAN Meeting 80, La Jolla, CA, U.S.A., Jun. 11-14, 2018, RP-180678 (Year: 2018).*
(Continued)

*Primary Examiner* — Joseph A Bednash

(57) ABSTRACT

According to an embodiment of the disclosure, a method of operating a user equipment (UE) to control an antenna port of the UE in a wireless communication system includes selecting a band for receiving control information and data at an initial access of the UE, reporting to the base station whether activation of the antenna port is supported, receiving antenna port activation indication information from the base station, and determining whether to activate the antenna port based on the received antenna port activation indication information.

17 Claims, 25 Drawing Sheets

(51) Int. Cl.
*H04W 24/08* (2009.01)
*H04W 72/0453* (2023.01)
*H04W 72/20* (2023.01)

(56) References Cited

U.S. PATENT DOCUMENTS

| | | | |
|---|---|---|---|
| 10,320,546 | B2 | 6/2019 | Kim et al. |
| 2009/0042615 | A1 | 2/2009 | Teo et al. |
| 2012/0127878 | A1 | 5/2012 | Kim et al. |
| 2012/0178502 | A1 | 7/2012 | Teo et al. |
| 2014/0211873 | A1 | 7/2014 | Park et al. |
| 2016/0043836 | A1 | 2/2016 | Shimezawa et al. |
| 2017/0195100 | A1 | 7/2017 | Kim et al. |
| 2017/0338879 | A1* | 11/2017 | Hessler ............... H04B 7/0456 |
| 2019/0053175 | A1* | 2/2019 | Kubota ............... H04W 16/14 |
| 2019/0253214 | A1* | 8/2019 | Liu ..................... H04B 7/0456 |
| 2019/0341976 | A1 | 11/2019 | Nam et al. |
| 2020/0014514 | A1* | 1/2020 | Gao ..................... H04W 72/04 |
| 2020/0153496 | A1 | 5/2020 | Park et al. |

FOREIGN PATENT DOCUMENTS

| | | |
|---|---|---|
| CN | 107819500 A | 3/2018 |
| CN | 107852301 A | 3/2018 |
| EP | 2023504 A2 | 2/2009 |
| JP | 2016-116045 A | 6/2016 |
| KR | 10-2009-0014978 A | 2/2009 |
| KR | 10-1061685 B1 | 9/2011 |
| KR | 10-2012-0055747 A | 6/2012 |
| KR | 20190120665 A | 10/2019 |
| WO | 10-2016-018100 A1 | 2/2016 |

OTHER PUBLICATIONS

MediaTek Inc., "Further Clarification on Initial DL BWP", 3GPP TSG-RAN WG2 Meeting #103, Gothenburg, Sweden, Aug. 20-24, 2018, R2-1811206 (Year: 2018).*
Nokia et al., "Rel-15 UE features and capabilities", 3GPP TSG RAN WG4 Meeting #88, Gothenburg, SE, Aug. 20-24, 2018, R4-1810875 (Year: 2018).*
Qualcomm Incorporated, "NR Features and Capabilities", 3GPP TSG RAN WG1 Meeting 93, Busan, Korea, May 21-25, 2018, R1-1807616 (Year: 2018).*
Qualcomm Incorporated, "On applicability rule for 8Rx demodulation requirement", 3GPP TSG RAN WG4 Meeting #88, Gothenburg, Sweden, Aug. 20-24, 2018, R4-1810534 (Year: 2018).*
International Search Report of the International Searching Authority in connection with International Application No. PCT/KR2019/011340 issued Dec. 17, 2019, 6 pages.
Written Opinion of the International Searching Authority dated Dec. 17, 2019 in connection with International Application No. PCT/KR2019/011340, 15 pages.
Supplementary European Search Report dated Aug. 31, 2021 in connection with European Patent Application No. 19 85 7728, 11 pages.
Communication pursuant to Article 94(3) EPC dated Jun. 7, 2023, in connection with European Application No. 19857728.0, 15 pages.
Office Action dated Aug. 10, 2023, in connection with Korean Application No. 10-2018-0137604, 9 pages.
Ericsson, "Discussion on UE capability list," R1-1806239, 3GPP-TSG-RAN WG1 Meeting #93, Busan, Korea, May 21-25, 2018, 43 pages.
Office Action dated Dec. 21, 2023, in connection with Korean Application No. 10-2018-0137604, 7 pages.
The First Office Action dated Dec. 20, 2023, in connection with Chinese Application No. 201980065166.2, 16 pages.

* cited by examiner

METHOD AND APPARATUS FOR CONFIGURING TERMINAL ANTENNA IN WIRELESS COMMUNICATION SYSTEM

CROSS-REFERENCE TO RELATED APPLICATIONS

This application is a 371 of International Application No. PCT/KR2019/011340 filed on Sep. 3, 2019, which claims priority to Korean Patent Application No. 10-2018-0104697 filed on Sep. 3, 2018 and Korean Patent Application No. 10-2018-0137604 filed on Nov. 9, 2018, the disclosures of which are herein incorporated by reference in their entirety.

BACKGROUND

1. Field

The disclosure relates to a wireless communication system, and more particularly, to a method and apparatus for configuring a terminal antenna in a wireless communication system.

2. Description of Related Art

In order to meet demand with respect to wireless data traffic, which is explosively increasing due to the commercialization of the $4^{th}$ generation (4G) communication system, an improved $5^{th}$ generation (5G) communication system or pre-5G communication system has been developed. For this reason, the 5G communication system or the pre-5G communication system is called a beyond 4G network communication system or a post-long term evolution (LTE) system.

To achieve a high data rate, the implementation of the 5G communication system in an ultra-high-frequency (mm-Wave) band, for example, a 60 GHz band, has been considered. In order to mitigate the path loss of radio waves and increase the transmission distance of radio waves in the ultra-high frequency band, beamforming, massive MIMO, full dimensional MIMO (FD-MIMO), array antenna, analog beam-forming, and large scale antenna techniques are being discussed in relation to the 5G communication system.

Furthermore, for the improvement of a system network, in the 5G communication system, technologies such as advanced small cells, advanced small cells, a cloud radio access network (cloud RAN), an ultra-dense network, device to device communication (D2D), wireless backhaul, a moving network, cooperative communication, coordinated multi-points (CoMP), reception interference cancellation, and the like, have been developed. In addition, in the 5G system, hybrid frequency shift keying and quadrature amplitude modulation (FQAM) and sliding window superposition coding (SWSC), which are advanced coding modulation (ACM) methods, and filter bank multi carrier (FBMC), non-orthogonal multiple access (NOMA), and sparse code multiple access (SCMA), which are advanced access techniques, are being developed.

The Internet is evolving from a human-centered connection network where humans generate and consume information, to an Internet of Things (IoT) network where information is exchanged and processed between distributed components such as things. Internet of Everything (IoE) technology, in which big data processing technology through a connection to a cloud server and the like is combined with the IoT technology, is also emerging. In order to implement the IoT, technical components such as sensing technology, wired/wireless communication and network infrastructure, service interface technology, and security technology are required. Recently, a sensor network, machine to machine (M2M) communication, machine type communication (MTC), and the like, for connection between things are being studied. In the IoT environment, intelligent Internet technology (IT) services that create new values in human life by collecting and analyzing data generated from connected things may be provided. The IoT may be applied to the fields of smart homes, smart buildings, smart cities, smart cars or connected cars, smart grids, health care, smart home appliances, advanced medical services, and the like, through fusion and convergence of existing information technology (IT) technology and various industries.

Accordingly, various attempts have been made to apply the 5G communication system to the IoT network. For example, technologies such as a sensor network, M2M communication, MTC, and the like, are being implemented by the 5G communication technologies such as beamforming, MIMO, array antennas, and the like. The use of the cloud RAN as the above-mentioned big data processing technology may be an example of the convergence of the 5G technology and the IoT technology.

As various services are provided based on the above descriptions and the development of a wireless communication system, a method of smoothly providing the services is required.

The disclosure provides various base station-user equipment (UE) operation methods for transmitting and receiving UE antenna deactivation and activation signals in a wireless communication system.

SUMMARY

According to an embodiment of the disclosure, a method of operating a user equipment (UE) to control an antenna port of the UE in a wireless communication system includes selecting a band for receiving control information and data at an initial access of the UE, reporting to the base station whether activation of the antenna port is supported, receiving antenna port activation indication information from the base station, and determining whether to activate the antenna port based on the received antenna port activation indication information.

DETAILED DESCRIPTION

Figure 1:
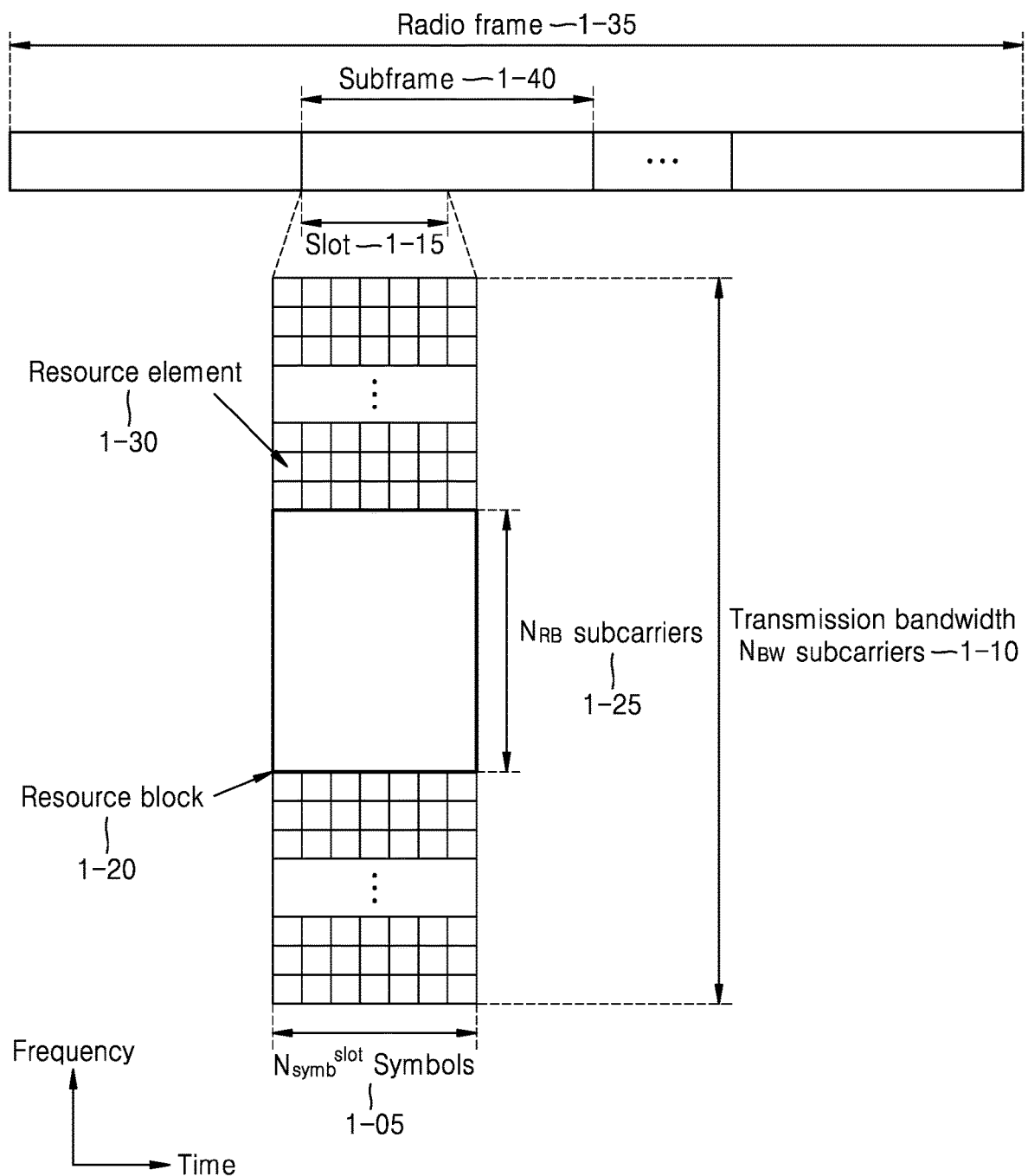
FIG. 1 is a view of a time-frequency domain transmission structure of LTE, LTE-A, NR or a wireless communication system similar thereto.

According to an embodiment of the disclosure, a method of operating a user equipment (UE) to control an antenna port of the UE in a wireless communication system includes selecting a band for receiving control information and data at an initial access of the UE, reporting to the base station whether activation of the antenna port is supported, receiving antenna port activation indication information from the base station, and determining whether to activate the antenna port, based on the received antenna port activation indication information.

According to an embodiment of the disclosure, in the method of operating the UE to control an antenna port of the UE in a wireless communication system, the reporting of whether activation of the antenna port is supported to the base station may include reporting, to the base station, a UE capability report including information about a maximum layer number of PDSCHs that is receivable by the UE.

In a method of operating the UE to control an antenna port of the UE in a wireless communication system, the reporting of whether activation of the antenna port is supported to the base station may include reporting to the base station whether a switching operation between a plurality of antenna port activation modes is supported.

According to an embodiment of the disclosure, in the method of operating the UE to control an antenna port of the UE in a wireless communication system, the reporting of whether activation of the antenna port is supported to the base station may include reporting to the base station the number of antenna ports to be activated.

According to an embodiment of the disclosure, in the method of operating the UE to control an antenna port of the UE in a wireless communication system, the reporting of whether activation of the antenna port is supported to the base station may include reporting, to the base station, whether a switching operation from a first activation mode in which a certain number of the antenna ports are activated, to a second activation mode in which a different number of the antenna ports from the certain number of the antenna ports number are activated.

According to an embodiment of the disclosure, in the method of operating the UE to control an antenna port of the UE in a wireless communication system, the reporting of whether activation of the antenna port is supported to the base station may include reporting to the base station in a bitmap whether the antenna port activation/deactivation switching is supported.

According to an embodiment of the disclosure, in the method of operating the UE to control an antenna port of the UE in a wireless communication system, the receiving of the antenna port activation indication information from the base station may include receiving from the base station the receiving antenna port activation indication information.

According to an embodiment of the disclosure, in the method of operating the UE to control an antenna port of the UE in a wireless communication system, the receiving of the antenna port activation indication information from the base station may include receiving, from the base station, the antenna port activation indication information through at least one of MAC CE and DCI.

According to an embodiment of the disclosure, in the method of operating the UE to control an antenna port of the UE in a wireless communication system, the receiving of the antenna port activation indication information from the base station may include receiving, from the base station, antenna port activation indication information for each bandwidth of the UE.

According to an embodiment of the disclosure, in the method of operating the UE to control an antenna port of the UE in a wireless communication system, the receiving of the antenna port activation indication information from the base station may include receiving, from the base station, antenna port activation indication information for each UE slot.

According to an embodiment of the disclosure, the method of operating the UE to control an antenna port of the UE in a wireless communication system may further include receiving an indication regarding an antenna port activation mode for measuring a channel state, measuring a channel state in the indicated antenna port activation mode, and reporting a measured channel state to the base station.

According to an embodiment of the disclosure, in the method of operating the UE to control an antenna port of the UE in a wireless communication system, the receiving of the indication regarding the antenna port activation mode for measuring a channel state may include receiving, from the base station, an indication regarding the antenna port activation mode for measuring a channel state, based on a CSI-RS resource set including at least one CSI-RS resource respectively mapped to at least one transmitting/receiving beam.

According to an embodiment of the disclosure, in the method of operating the UE to control an antenna port of the UE in a wireless communication system, the receiving of the indication regarding the antenna port activation mode for measuring a channel state may include receiving an indication from the base station regarding an antenna port activation mode for measuring a channel state, based on at least one CSI-RS resource including information about a reference signal.

According to an embodiment of the disclosure, in the method of operating the UE to control an antenna port of the UE in a wireless communication system, the receiving of the indication regarding the antenna port activation mode for measuring a channel state may include receiving an indication from the base station regarding an antenna port activation mode for measuring a channel state, based on the CSI resource setting including at least one CSI-RS resource set.

According to an embodiment of the disclosure, in the method of operating the UE to control an antenna port of the UE in a wireless communication system, the receiving of the indication regarding the antenna port activation mode for measuring a channel state may include receiving an indication from the base station regarding an antenna port activation mode for measuring a channel state, based on the CSI report setting including information about a CSI reporting method.

According to an embodiment of the disclosure, in the method of operating the UE to control an antenna port of the UE in a wireless communication system, the receiving of the indication regarding the antenna port activation mode for measuring a channel state may include receiving an indication from the base station regarding an antenna port activation mode for measuring a channel state, based on transmission characteristics of a reference signal including in at least one or more of CSI resource setting and CSI report setting, and the whether the activation of the antenna port is supported.

According to an embodiment of the disclosure, in the method of operating the UE to control an antenna port of the UE in a wireless communication system, the receiving of the antenna port activation indication information from the base station may include receiving the antenna port activation indication information from the base station, based on a CSI report setting triggered according to a CSI request field mapped to a trigger state.

According to an embodiment of the disclosure, the method of operating the UE to control an antenna port of the UE in a wireless communication system may further include measuring channel state information based on an antenna port activation mode at a time point when a CSI-RS resource is received from the base station, and reporting, to the base station, the measured channel state information and activation/deactivation configuration information of antenna port on which the channel state information is measured.

According to an embodiment of the disclosure, the method of operating the UE to control an antenna port of the UE in a wireless communication system may further include, before receiving a CSI-RS resource from the base station, changing the activation mode of the antenna port to a certain first activation mode, when receiving the CSI-RS resource from the base station, measuring channel state information for each at least one activation mode, based on the certain first activation mode, and reporting the measured channel state information to the base station.

According to an embodiment of the disclosure, the method of operating the UE to control an antenna port of the UE in a wireless communication system may further include measuring channel state information based on an antenna port activation mode of a band for receiving a CSI-RS resource from the base station, and reporting the measured channel state information to the base station.

According to an embodiment of the disclosure, the method of operating the UE to control an antenna port of the UE in a wireless communication system may further include measuring channel state information based on an antenna port activation mode with respect to a CSI-RS reference resource from the base station, and reporting the measured channel state information to the base station According to an embodiment of the disclosure, a method of operating a base station to control an antenna port of a UE in a wireless communication system includes receiving a report from the UE whether activation of the antenna port is supported, and transmitting antenna port activation indication information to the UE, based on the reported antenna port activation support.

According to an embodiment of the disclosure, a UE for controlling an antenna port of the UE in a wireless communication system includes a transmitting/receiving unit, a memory storing a program, and a processor configured to, by executing the program, select a band for receiving control information and data at an initial access of the UE, report whether activation of the antenna port is supported to base station, receiving antenna port activation indication information from the base station, and determine whether to activate the antenna port, based on the received antenna port activation indication information.

According to an embodiment of the disclosure, a base station for controlling an antenna port of a UE in a wireless communication system includes a transmitting/receiving unit, a memory storing a program, and a processor configured to, by executing the program, receive a report whether activation of the antenna port is supported from the UE, and transmit antenna port activation indication information to the UE, based on the reported antenna port activation support.

Hereinafter, embodiments of the present disclosure are described in detail with reference to the accompanying drawings.

In the following description, descriptions on the technical contents that are well-known in the art to which the present disclosure pertains and are not directly related to the present disclosure are omitted functions or configurations will be omitted since they would unnecessarily obscure the subject matters of the disclosure. This is to prevent the unnecessary descriptions from obscuring the subject matters of the present disclosure and to further clearly describe the gist of the present disclosure.

For the same reason, each element illustrated in the drawings may be exaggerated, omitted, or schematically illustrated. Furthermore, the illustrated size of each element does not substantially reflect its actual size. In each drawing, like reference numerals denote like or corresponding elements.

Advantages and features of the disclosure and methods of accomplishing the same may be understood more readily by reference to the following detailed description of exemplary embodiments and the accompanying drawings. However, the disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the disclosure will only be defined by the appended claims. Like reference numerals refer to like elements throughout the specification.

It will be understood that blocks of flowcharts and combinations of the flowcharts may be performed by computer program indications. Because these computer program indications may be loaded into a processor of a general-purpose computer, a special-purpose computer, or another programmable data processing apparatus, the indications, which are performed by a processor of a computer or another programmable data processing apparatus, create units for performing functions described in the flowchart block(s). The computer program indications may be stored in a computer-usable or computer-readable memory capable of directing a computer or another programmable data processing apparatus to implement a function in a particular manner, and thus the indications stored in the computer-usable or computer-readable memory may also be capable of producing manufacturing items containing indication units for performing the functions described in the flowchart block(s). The computer program indications may also be loaded into a computer or another programmable data processing apparatus, and thus, indications for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable indications for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

As used herein, the term "unit" means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Accordingly, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. As used herein, the "unit" may include at least one processor.

Hereinafter, embodiments of the disclosure will be described in detail with reference to the attached drawings. In the following description, a detailed description of known functions and configurations incorporated herein will be omitted when it may make the subject matter of the disclosure unclear. The terms used herein are defined considering functions in the disclosure, and can be changed according to the customs or intents of users or operators. Accordingly, definitions of the terms should be understood on the basis of the entire description of the disclosure.

In the following description, terms used to indicate broadcast information, terms used to indicate control information, terms related to communication coverage, terms used to indicate a state change, e.g., event, terms used to indicate network entities terms used to indicate messages, terms used to indicate constituent elements of a device, and the like are exemplified for convenience of explanation. Accordingly, the disclosure is not limited to the terms described below, and other terms that refer to objects having equivalent technical meanings can be used. As used herein, a base station is an entity for assigning resources to a UE, and examples thereof may include at least one of an eNode B, a Node B, a base station (BS), a wireless access unit, a base station controller, or a network node. Examples of a terminal may include a user equipment (UE), a mobile station (MS), a cellular phone, a smartphone, a computer, a multimedia system capable of performing a communication function, or the like. However, the disclosure is not limited to the above examples.

Hereinafter, the disclosure describes a technology for a UE to transmit/receive information with a base station in a wireless communication system. The disclosure relates to a broadband wireless communication system for providing high speed and high quality data services such as a 5G communication system and a communication technique that converges with application services such as Internet of Things (IoT), and the like, and a system thereof. The disclosure may be applied to intelligent services, for example, smart homes, smart buildings, smart cities, smart cars or connected cars, health care, digital education, retails, security, and safety related service, and the like, based on 5G communication technology and IoT related technology.

Hereinbelow, for convenience of explanation, terms and names defined in the $3^{rd}$ generation partnership project (3GPP) long term evolution (LTE) standard and/or the 3GPP new radio (NR) standard may be partially used. However, the disclosure is not limited by the terms and names, and can be applied to systems conforming to other standards.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), and LTE-advanced (LTE-A) of 3GPP, high rate packet data (HRPD) and ultra mobile broadband (UMB) of 3GPP2, and 802.16e of the Institute of Electrical and Electronics Engineers (IEEE).

As a representative example of broadband wireless communication systems, NR systems employ orthogonal frequency-division multiplexing (OFDM) on DL, and employ both of OFDM and single-carrier frequency-division multiple access (SC-FDMA) on UL. The UL refers to a radio link for transmitting data or control signals from a terminal, a user equipment (UE), or a mobile station (MS) to an eNode B or a base station (BS), and the DL refers to a radio link for transmitting data or control signals from the eNode B or the BS to the terminal, the UE, or the MS. The above-described dual connectivity schemes distinguish between data or control information of different users by assigning and using time-frequency resources for carrying the data or control information of the users not to overlap each other, i.e., to achieve orthogonality therebetween.

As the 5G communication system as a post-LTE communication system freely reflect various requests of users, service providers, and the like, services satisfying various requests are supported. Services considered for the 5G communication system include enhanced mobile broad band (eMBB), massive machine type communication (mMTC), and ultra-reliable and low latency communication (URLLC).

According to some embodiments, eMBB aims to provide a more improved data rate than the data rate supported by the existing LTE, LTE-A, or LTE-A Pro. For example, in the 5G communication system, eMBB is able to provide a peak data rate of 20 Gbps in a downlink and 10 Gbps in an uplink, in terms of one base station. Simultaneously, eMBB may be able to provide an increased user perceived data rate of a UE. To satisfy the above requirements, the improvement of transmission/receiving technology including more enhanced multi input multi output (MIMO) transmission technology is needed. In addition, it is possible to satisfy the data rate required by the 5G communication system by using a frequency bandwidth wider than 20 MHz in a frequency band of 3 to 6 GHz or 6 GHz or more, instead of the 2 GHz band currently used by LTE.

Simultaneously, in the 5G communication system, mMTC is being considered to support application services such as IoT. In order to efficiently provide IoT, mMTC may require large-scale UE access support in a cell, improved UE coverage, improved battery time, reduced UE costs, and the like. IoT that is attached to various sensors and various devices to provide a communication function may be able to support a large number of UEs (for example, 1,000,000 UE/km$^2$) within a cell. In addition, as a UE supporting mMTC is highly likely to be located in a shaded area not covered by the cell, such as a basement of a building, due to the nature of a service, the UE may require a wider coverage than other services provided by the 5G communication system. A UE supporting mMTC may be configured as a low-cost UE, and as it is difficult to frequently exchange the battery of a UE, a very long battery life time may be required.

Finally, in the case of URLLC, as a cellular-based wireless communication service used for a specific purpose (mission-critical), as a service used for remote control of robots or machinery, industrial automation, unmanned aerial vehicles, remote health care, emergency alerts, etc., communication that provides ultra-low latency and super reliability may be provided. For example, a service supporting URLLC may satisfy a wireless access delay time (air interface latency) less than 0.5 milliseconds (ms), and simultaneously may have a requirement of a packet error rate of 10^−5 or less. Accordingly, for a service supporting URLLC, the 5G system may provide a transmit time interval (TTI) smaller than other services, and design requirements of simultaneously allocating a wide resource in a frequency band are required. However, the above-described mMTC, URLLC, and eMBB are merely examples of different service types, and the service types subject to the disclosure are not limited to the above-described examples.

Services considered in the above-described 5G communication system may be provided by being fused with each other based on a single framework. In other words, for efficient resource management and control, respective services may be integrated into one system, and controlled and transmitted.

Hereinafter, the frame structures of the LTE, LTE-A, LTE-A Pro, and 5G NR systems will be described in detail with reference to the drawings.

FIG. 1 is a view of a basic structure of a time-frequency resource domain that is a radio resource domain on which data or a control channel of LTE, LTE-A, LTE-A Pro, or a 5G NR system based on a cyclic prefix (CP) OFDM (CP-OFDM) or SC-FDMA waveform is transmitted. In FIG. 1, the horizontal axis indicates a time domain, and the vertical axis indicates a frequency domain.

A minimum transmission unit in the time domain of the LTE, LTE-A, LTE-A Pro, or 5G NR system is an OFDM symbol or an SC-FDMA symbol, and Nsymb^slot number of symbols (1-05) may be gathered to constitute a single slot (1-15).

For LTE, LTE-A, or LTE-A Pro, two slots, each including Nsymb=7 number of symbols, may constitute one subframe (1-40).

According to an embodiment of the disclosure, Nsymb^-slot may be determined according to the length of a cyclic prefix (CP) added to prevent interference between symbols.

For example, in the 5G NR, when a general CP is employed, Nsymb=14, and when an expandable CP is employed, Nsymb=12. The expandable CP may be applied to a system having a relatively large radio wave transmission distance compared to the general CP so as to maintain orthogonality between symbols.

According to an embodiment of the disclosure, the 5G NR may support two types of slot structures of a slot and a mini-slot. A mini-slot may be referred to as a non-slot.

The length of a slot in the LTE and LTE-A may be 0.5 ms, and the length of a subframe may be 1.0 ms. For the 5G NR system, the length of a slot or mini-slot may be flexibly changed according to a subcarrier spacing. The minimum transmission unit in the frequency domain in the LTE, LTE-A, or LTE-A Pro is subcarrier of a 15 kHz unit (subcarrier spacing=15 kHz), and the bandwidth of the entire system transmission band (transmission bandwidth) consists of a total of a NBW number of subcarriers (1-10). A flexible expandable frame structure of the 5G NR system is described later.

A basic unit of a resource in the time-frequency domain is a resource element (RE) (1-30) and may be indicated by an OFDM symbol or SC-FDMA symbol index and a subcarrier index. A resource block (RB) or a physical resource block (PRB) (1-20) may be defined by Nsymb^slot number of consecutive OFDM symbols (1-05) or SC-FDMA symbols in the time domain and NRB number of consecutive subcarriers (1-25) in the frequency domain. Accordingly, one RB (1-20) consists of Nsymb×NRB number of REs (1-30). Data is mapped in units of RBs, and a base station performs scheduling in units of RBs on a certain UE.

According to an embodiment of the disclosure, the subcarrier spacing, the CP length, and the like are pieces of information needed for OFDM transmission/receiving, which are values perceived by the base station and the UE as common values.

The frame structure of the LTE and LTE-A system is a design considering typical voice/data communication, and may have a limitation in the expandability to satisfy the requirements of various services and users like the 5G NR system. Accordingly, in the 5G NR system according to an embodiment of the disclosure, the requirements of various services and users may be satisfied by defining the frame structure to be flexible.

Figure 2:
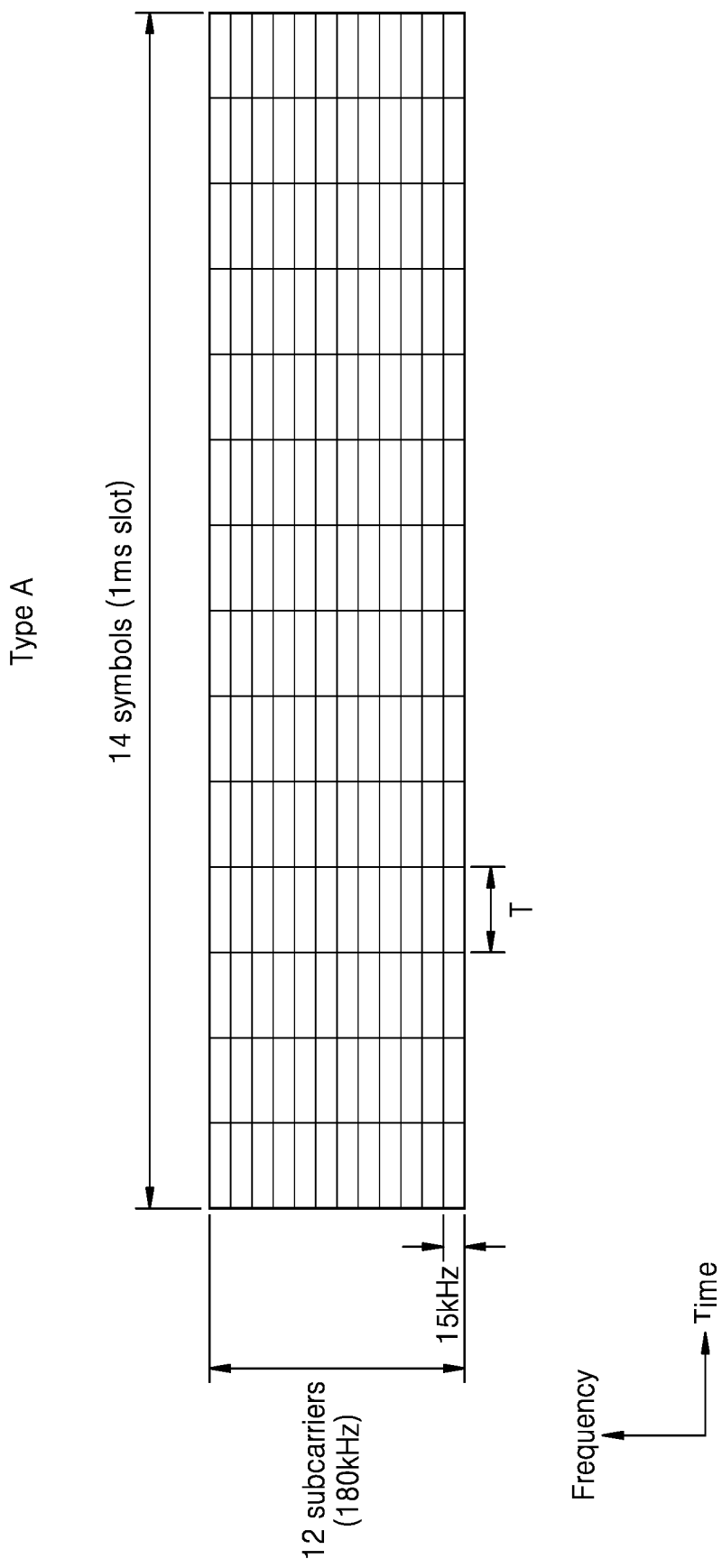
FIGS. 2 to 4 are views of an expandable frame structure according to an embodiment of the disclosure.
Figure 3:
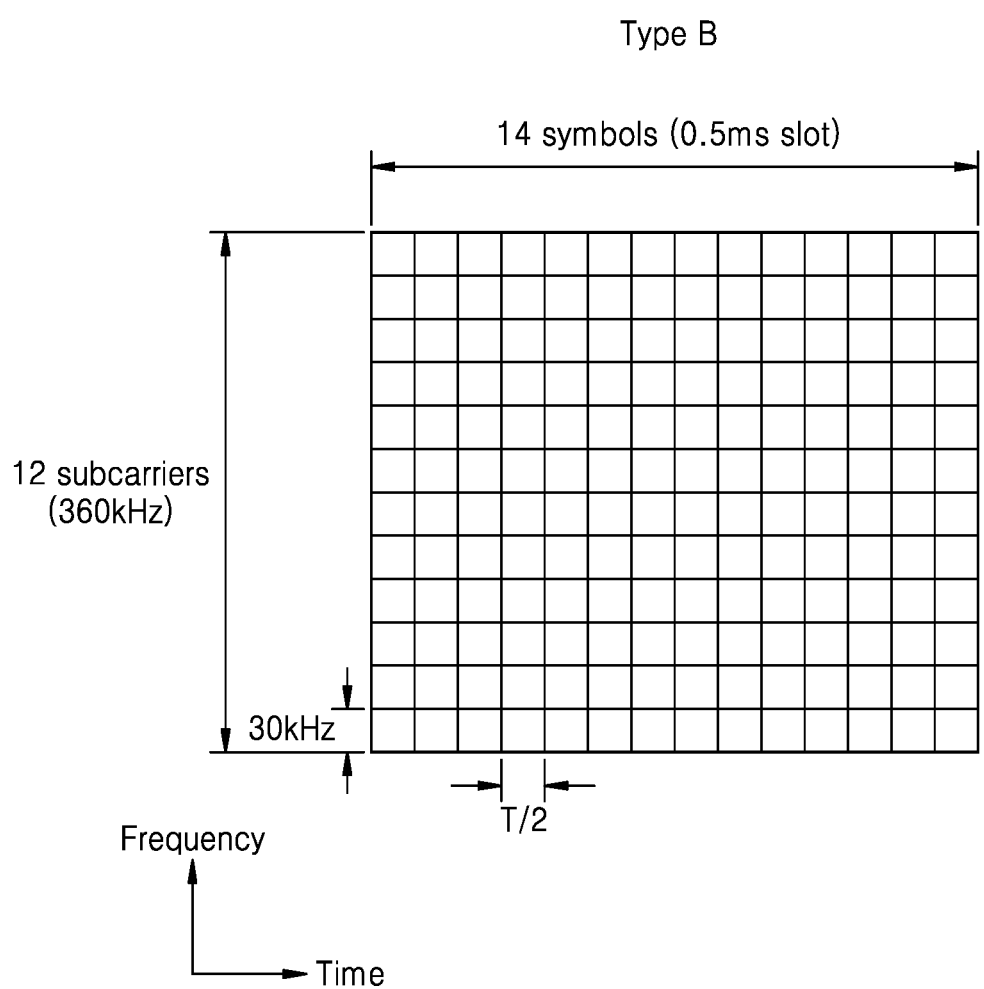
Figure 4:
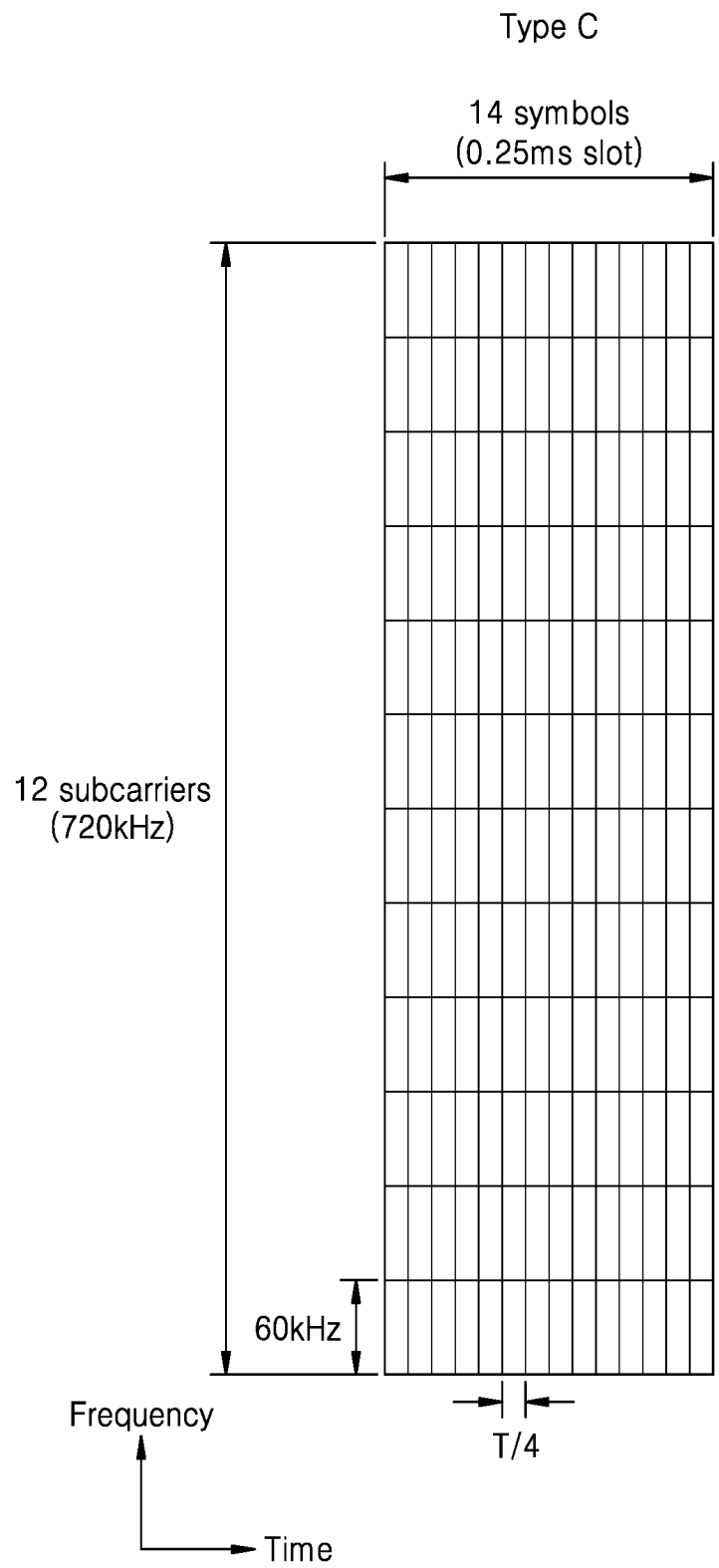

FIGS. 2 to 4 are views of an expandable frame structure according to some embodiments.

According to an embodiment of the disclosure, an essential parameter set for defining an expandable frame structure may include a subcarrier spacing, a CP length, a slot length, and the like. In the 5G NR system, a basic time unit for performing scheduling may be a slot.

The 5G NR system may be independently operated or may coexist with an LTE/LTE-A/LTE-A Pro system to be operated in a dual mode. Accordingly, the existing LTE/LTE-A/LTE-A Pro may provide a stable system operation, and the 5G NR system may provide an enhanced service. Accordingly, the expandable frame structure of the 5G system may include the frame structure or essential parameter set of the LTE/LTE-A/LTE-A Pro.

According to an embodiment of the disclosure, FIG. 2 is a view of a 5G NR frame structure or essential parameter set like the frame structure of the LTE/LTE-A/LTE-A Pro. In the frame structure type A of FIG. 2, subcarrier spacing is 15 kHz, 14 symbols constitute a 1 ms slot, and 12 subcarriers (=180 kHz=12×15 kHz) constitute a PRB.

According to an embodiment of the disclosure, in a frame structure type B of FIG. 3, subcarrier spacing is 30 kHz, 14 symbols constitute a 0.5 ms slot, and 12 subcarriers (=360 kHz=12×30 kHz) constitute a PRB. In other words, compared with the frame structure type A, the sizes of subcarrier spacing and PRB increase twice, and the slot length and the symbol length decrease by half.

According to an embodiment of the disclosure, in a frame structure type C of FIG. 4, subcarrier spacing is 60 kHz, 14 symbols constitute a 0.25 ms subframe, 12 subcarriers (=720 kHz=12×60 kHz) constitute a PRB. In other words, compared with the frame structure type A, the sizes of subcarrier spacing and PRB increase four times, and the slot length and the symbol length decrease four times.

In other words, when the frame structure type is generalized, by allowing the essential parameter set including the subcarrier spacing, the CP length, the slot length, and the like to have an integer multiple relationship therebetween for each frame structure type, high expandability may be provided.

A subframe having a fixed length of 1 ms may be defined to indicate a reference time unit that is irrelevant to the above-described frame structure type. Accordingly, in the frame structure type A, one subframe may consist of one slot, in the frame structure type B, one subframe may consist of two slots, and in the frame structure type C, one subframe may consist of four slots. The expandable frame structure is not limited to the above-described frame structure types A and B, or C, and may be applied to other subcarrier spacings such as 120 kHz or 240 kHz and may have a different structure.

According to an embodiment of the disclosure, the above-described frame structure types may be applied to various scenarios.

In terms of cell size, as a larger cell is supportable as the CP length increases, the frame structure type A may support a relatively large cell compared with the frame structure types B and C.

In terms of operation frequency band, as the subcarrier spacing increases, phase noise recovery of a high frequency band is advantageous, and thus the frame structure type C may support a relatively high operation frequency compared with the frame structure types A and B.

In terms of service, like ultra-reliable low latency communication (URLLC), it is advantageous to support an ultra-reliable low latency service as a subframe length decreases, and thus the frame structure type C is relatively suitable for a URLLC service compared with the frame structure types A and B.

According to an embodiment of the disclosure, various frame structure types may be multiplexed and integrally operated in one system.

Next, a channel state information measurement and reporting process between a base station and a UE in the 5G NR system is described in detail.

Figure 5:
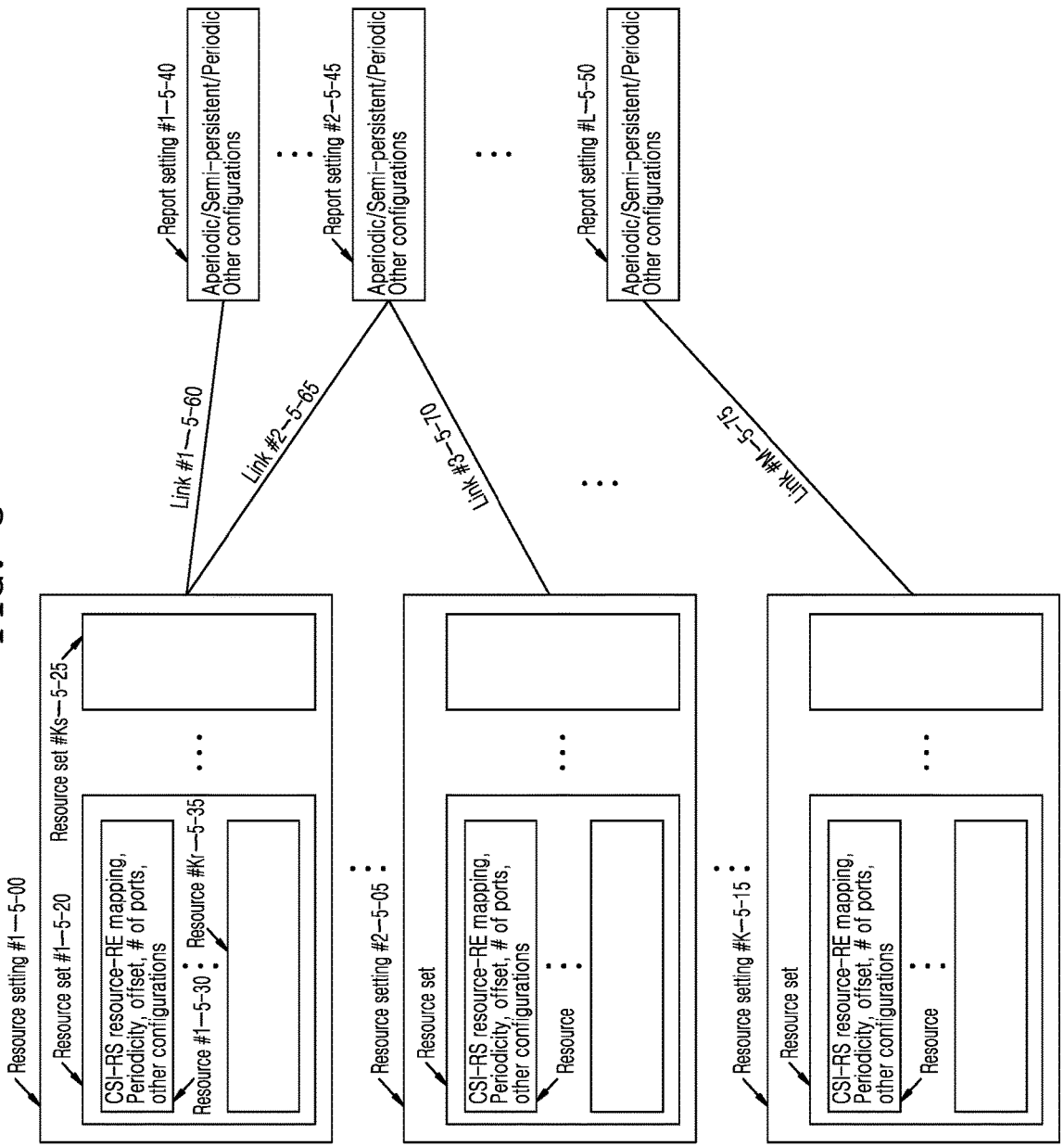
FIG. 5 is a view of a framework of channel state information, according to an embodiment of the disclosure.

FIG. 5 is a view of a channel state information framework of the 5G NR system, according to some embodiments. A CSI framework of an NR of FIG. 5 may consist of two elements of a resource setting and a report setting. The report setting may include at least one link of each other by referring to an ID of the resource setting.

According to an embodiment of the disclosure, the resource setting may include information related to a reference signal (RS). A base station may configure a UE with at least one resource setting (5-00, 5-05, 5-15). Each resource setting may include at least one resource set (5-20, 5-25). Each resource set may include at least one resource (5-30, 5-35). Each resource (5-30, 5-35) may include detailed information about an RS, for example, RE location information regarding transmission of an RS, RS transmission periodicity and offset on a time axis, the number of RS ports, and the like.

According to an embodiment of the disclosure, the report setting may include information related to a CSI reporting method. The base station may configure the UE with at least one report setting (5-40, 5-45, 5-50). In this state, each report setting may include report transmission characteristics information such as being aperiodic, semi-persistent, periodic, and the like, types of channels for transmitting a report, for example, a physical uplink shared channel (PUSCH) or a physical uplink control channel (PUCCH), and the like, and types of channel state information to report, for example, the number of ranks, a precoding matrix index, a channel quality indicator (CQI), and the like. Furthermore, each report setting may include a frequency band for a channel state information report, whether to use a wideband PMI/CQI for reporting one PMI or CQI to the entire frequency band, or whether to use a subband PMI/CQI for reporting one PMI or CQI for each subband after dividing the frequency band into several subbands. In this state, the report setting may include at least one ID for referring to reference signal (or RE location) information for channel or interference measurement referred to by the UE during CSI reporting. This is diagramed through links (5-60, 5-65, 5-70, 5-75).

According to an embodiment of the disclosure, when the link (5-60) connects one reporting setting (5-40) to one resource setting (5-00), a resource setting (5-00) may be used for channel measurement.

According to an embodiment of the disclosure, when the links (5-65, 5-70) connect one reporting setting (5-45) to two resource settings (5-00, 5-05), one of the resource settings may be used for channel measurement, and the other resource setting may be used for interference measurement.

According to an embodiment of the disclosure, each resource setting may include resource transmission characteristics information such as being aperiodic, semi-persistent, periodic, and the like, and may include transmission band information such as a BWP and the like in which a resource is transmitted.

According to an embodiment of the disclosure, each resource set in the resource setting may configure information including values listed below through a higher layer. However, the disclosure is not limited to the following example.

repetition: information related to a spatial domain transmission filter
regarding resources in a resource set
*-trs-Info: information about whether resources in a resource set is used as a tracking RS (TRS) for time/frequency tracking When the repetition is "ON", the UE may see that the same spatial domain transmission filter is applied to all of the resources belonging to a resource set. In other words, the UE may assume that the base station used the same transmission beam. Furthermore, the UE may see that each resource has the same port number and periodicity.

When the repetition is "OFF", the UE may not assume that the same spatial domain transmission filter is applied to all of non-zero power (NZP) CSI-RS resources belonging to a resource set. In other words, the UE may not assume that the base station used the same transmission beam. The UE may not know that each resource has the same port number and periodicity.

The NZP CSI-RS may be the most representative reference signal to be configured in a resource set. The resource set may be configured with information including values listed below through a higher layer for each CSI-RS. However, the disclosure is not limited to the following example.

periodicityAndOffset: transmission periodicity and slot offset of the CSI-RS resource CSI-RS-resourceMapping: OFDM symbol location in a slot and subcarrier location in a PRB of the CSI-RS resource nrofPorts: the number of CSI-RS ports included in the CSI-RS resource density: frequency density of the CSI-RS.

cdm-Type: CDM length and CDM RE pattern of the CSI-RS.

powerControlOffset: a ratio between PDSCH EPRe (Energy Per RE) and NZP CSI-RS EPRE powerControlOffsetSS: a ratio between SS/PBCH block EPRE and NZP CSI-RS EPRE According to an embodiment of the disclosure, in the 5G NR, one CSI-RS resource may be configured with one CSI-RS port number of {1, 2, 4, 8, 12, 16, 24, 32}. Different degrees of configuration freedom may be supported according to the CSI-RS port number configured in the CSI-RS resource.

Table 1 shows a CSI-RS density configurable according to the NR CSI-RS port number (X), CDM length and type, frequency-axis and time-axis start locations ($\bar{k}$, $\bar{l}$) of a CSI-RS component RE pattern, and a frequency-axis RE number (k') and a time-axis RE number (l') of the CSI-RS component RE pattern.

According to an embodiment of the disclosure, the CSI-RS component RE pattern may be a basic unit constituting a CSI-RS resource. The CSI-RS component RE pattern may consist of YZ number of REs through (Y=1+max(k')) number of REs of the frequency axis and (Z=1+max(l')) number of REs of the time axis.

Figure 6:
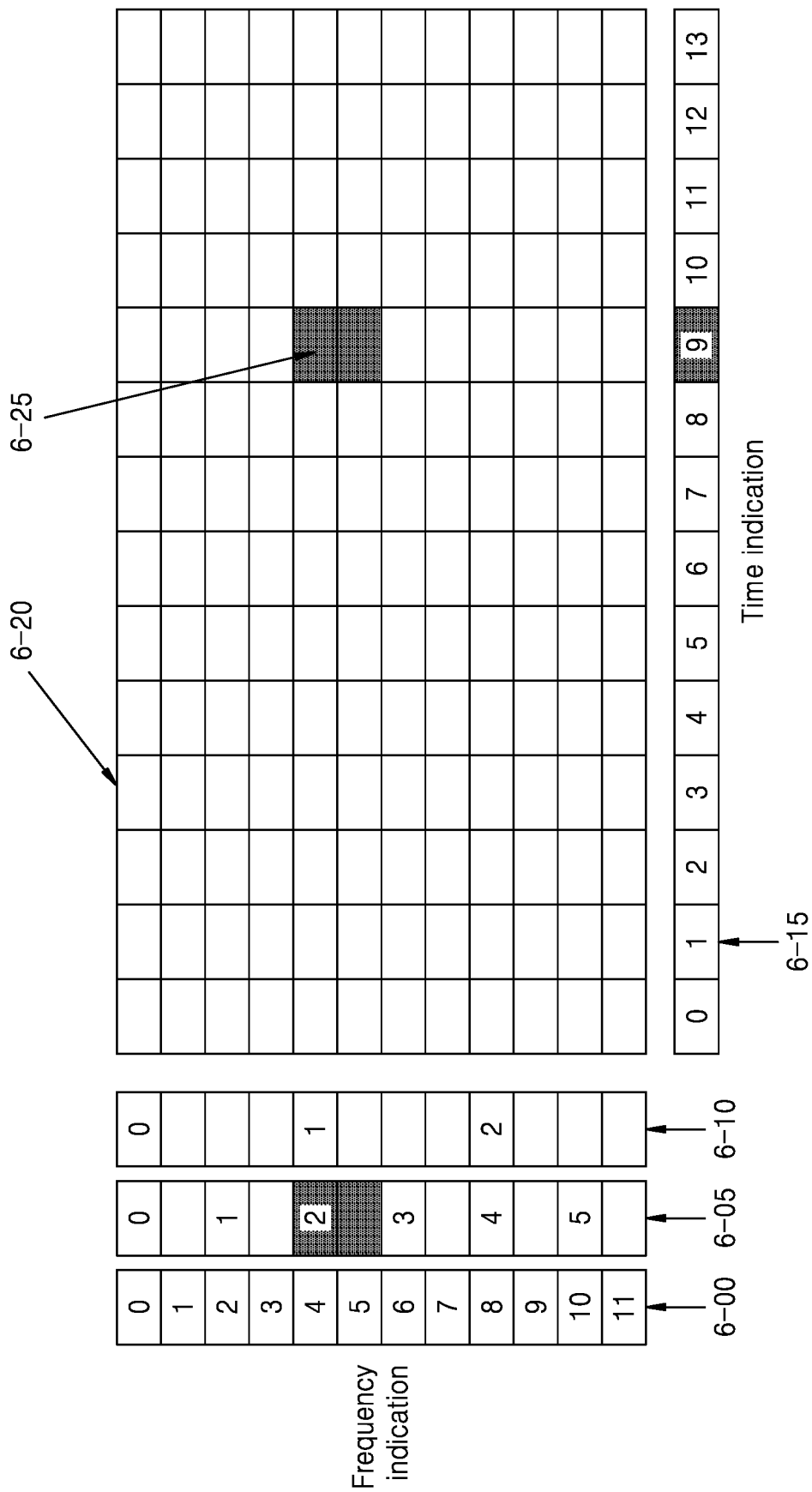
FIG. 6 is a view of an assignment of a CSI-RS resource element by CSI-RS resource mapping, according to an embodiment of the disclosure.

FIG. 6 illustrates an example of assignment of a CSI-RS RE by CSI-RS resource mapping, according to an embodiment of the disclosure.

When the CSI-RS port number is configured to be X=2 port and Y=2 and Z=1, the base station may assign a frequency axis RE location by (7-05). In this state, when the base station assigns a frequency axis subcarrier location by "2" of (7-05) and assigns a time-axis OFDM symbol location by "9" of (7-15), the UE may see that a CSI-RS is transmitted at a RE location of (7-25) in the PRB (7-20).

Referring to Table 1, NR may support different frequency axis configuration freedom degree according to a CSI-RS port number configured in the CSI-RS resource.

When the CSI-RS port number is 1 port, a CSI-RS RE location may be assigned without a limit of a subcarrier in the PRB, and the CSI-RS RE location may be assigned by a 12-bit bitmap (FIG. 6, 6-00).

When the CSI-RS port number is {2, 4, 8, 12, 16, 24, 32} ports and Y=2, the CSI-RS RE location may be assigned every two subcarriers in the PRB, and the CSI-RS RE location may be assigned by a 6-bit bitmap (6-05).

When the CSI-RS port number is 4 ports and Y=4, the CSI-RS RE location may be assigned every four subcarriers in the PRB, and the CSI-RS RE location may be assigned by a 3-bit bitmap (6-10).

Similarly thereto, the time-axis RE location may be assigned by a total 14-bit bitmap.

In this state, according to the Z value of Table 1, the length of bitmap may be changed like the frequency location assignment. As a principle thereof is similar to the above description, redundant descriptions are omitted in the following description.

TABLE 1

| | | | | CSI-RS locations within a slot | | | |
|---|---|---|---|---|---|---|---|
| Row | Ports X | Density ρ | Ccdm-Type | ($\bar{k}$, $\bar{l}$) | CDM group index j | k' | l' |
| 1 | 1 | 3 | No CDM | $(k_0, l_0)$, $(k_0 + 4, l_0)$, $(k_0 + 8, l_0)$ | 0, 0, 0 | 0 | 0 |
| 2 | 1 | 1, 0.5 | No CDM | $(k_0, l_0)$ | 0 | 0 | 0 |
| 3 | 2 | 1, 0.5 | FD-CDM2 | $(k_0, l_0)$ | 0 | 0, 1 | 0 |
| 4 | 4 | 1 | FD-CDM2 | $(k_0, l_0)$, $(k_0 + 2, l_0)$ | 0, 1 | 0, 1 | 0 |
| 5 | 4 | 1 | FD-CDM2 | $(k_0, l_0)$, $(k_0, l_0 + 1)$ | 0, 1 | 0, 1 | 0 |
| 6 | 8 | 1 | FD-CDM2 | $(k_0, l_0)$, $(k_1, l_0)$, $(k_2, l_0)$, $(k_3, l_0)$ | 0, 1, 2, 3 | 0, 1 | 0 |
| 7 | 8 | 1 | FD-CDM2 | $(k_0, l_0)$, $(k_1, l_0)$, $(k_0, l_0 + 1)$, $(k_1, l_0 + 1)$ | 0, 1, 2, 3 | 0, 1 | 0 |
| 8 | 8 | 1 | CDM4 (FD2,TD2) | $(k_0, l_0)$, $(k_1, l_0)$ | 0, 1 | 0, 1 | 0, 1 |
| 9 | 12 | 1 | FD-CDM2 | $(k_0, l_0)$, $(k_1, l_0)$, $(k_2, l_0)$, $(k_3, l_0)$, $(k_4, l_0)$, $(k_5, l_0)$ | 0, 1, 2, 3, 4, 5 | 0, 1 | 0 |
| 10 | 12 | 1 | CDM4 (FD2,TD2) | $(k_0, l_0)$, $(k_1, l_0)$, $(k_2, l_0)$ | 0, 1, 2 | 0, 1 | 0, 1 |
| 11 | 16 | 1, 0.5 | FD-CDM2 | $(k_0, l_0)$, $(k_1, l_0)$, $(k_2, l_0)$, $(k_3, l_0)$, $(k_0, l_0 + 1)$, $(k_1, l_0 + 1)$, $(k_2, l_0 + 1)$, $(k_3, l_0 + 1)$ | 0, 1, 2, 3, 4, 5, 6, 7 | 0, 1 | 0 |
| 12 | 16 | 1, 0.5 | CDM4 (FD2,TD2) | $(k_0, l_0)$, $(k_1, l_0)$, $(k_2, l_0)$, $(k_3, l_0)$ | 0, 1, 2, 3 | 0, 1 | 0, 1 |
| 13 | 24 | 1, 0.5 | FD-CDM2 | $(k_0, l_0)$, $(k_1, l_0)$, $(k_2, l_0)$, $(k_0, l_0 + 1)$, $(k_1, l_0 + 1)$, $(k_2, l_0 + 1)$, $(k_0, l_1)$, $(k_1, l_1)$, $(k_2, l_1)$, $(k_0, l_1 + 1)$, $(k_1, l_1 + 1)$, $(k_2, l_1 + 1)$ | 0, 1, 2, 3, 4, 5, 6, 7, 8, 9, 10, 11 | 0, 1 | 0 |
| 14 | 24 | 1, 0.5 | CDM4 (FD2, TD2) | $(k_0, l_0)$, $(k_1, l_0)$, $(k_2, l_0)$, $(k_0, l_1)$, $(k_1, l_1)$, $(k_2, l_1)$ | 0, 1, 2, 3, 4, 5 | 0, 1 | 0, 1 |
| 15 | 24 | 1, 0.5 | CDM8 (FD2, TD4) | $(k_0, l_0)$, $(k_1, l_0)$, $(k_2, l_0)$ | 0, 1, 2 | 0, 1 | 0, 1, 2, 3 |
| 16 | 32 | 1, 0.5 | FD-CDM2 | $(k_0, l_0)$, $(k_1, l_0)$, $(k_2, l_0)$, $(k_3, l_0)$, $(k_0, l_0 + 1)$, $(k_1, l_0 + 1)$, $(k_2, l_0 + 1)$, $(k_3, l_0 + 1)$, $(k_0, l_1)$, $(k_1, l_1)$, $(k_2, l_1)$, $(k_3, l_1)$, $(k_0, l_1 + 1)$, $(k_1, l_1 + 1)$, $(k_2, l_1 + 1)$, $(k_3, l_1 + 1)$ | 0, 1, 2, 3, 4, 5, 6, 7, 8, 9, 10, 11, 12, 13, 14, 15 | 0, 1 | 0 |

TABLE 1-continued

CSI-RS locations within a slot

| Row | Ports X | Density ρ | Ccdm-Type | $(\bar{k}, \bar{l})$ | CDM group index j | k' | l' |
|---|---|---|---|---|---|---|---|
| 17 | 32 | 1, 0.5 | CDM4 (FD2,TD2) | $(k_0, l_0), (k_1, l_0), (k_2, l_0), (k_3, l_0),$ $(k_0, l_1), (k_1, l_1), (k_2, l_1), (k_3, l_1)$ | 0, 1, 2, 3, 4, 5, 6, 7 | 0, 1 | 0, 1 |
| 18 | 32 | 1, 0.5 | CDM8 (FD2,TD4) | $(k_0, l_0), (k_1, l_0), (k_2, l_0), (k_3, l_0)$ | 0, 1, 2, 3 | 0, 1 | 0, 1, 2, 3 |

Figure 7:
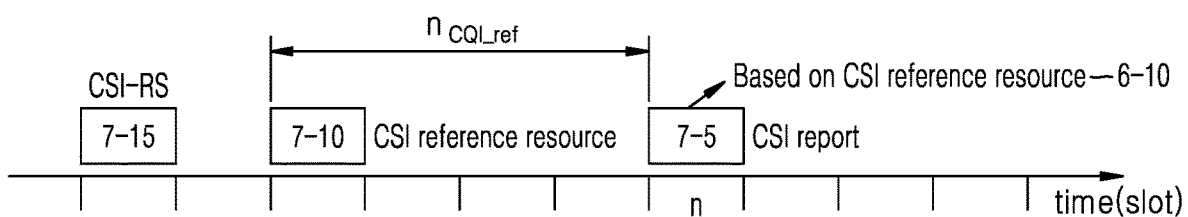
FIG. 7 is a view of a relationship among a channel state information report, a CSI reference resource, and a CSI-RS, according to an embodiment of the disclosure.

FIG. 7 is a view of a relationship among a channel state information report, a CSI reference resource, and a CSI-RS resource.

According to an embodiment of the disclosure, the UE may report, to the base station, channel state information based on one or a plurality of PRBs referred to as the CSI reference resource. In the frequency domain, the CSI reference resource may indicate a PRB for a frequency band corresponding to a wideband or subband CQI value to be reported. The frequency band herein may be a frequency band for the above-mentioned channel state information report. In the time domain, the CSI reference resource (7-10) may indicate one downlink slot corresponding to the following mathematical expression when the channel state information report is performed in an uplink slot n (7-5).

$$n - n_{CQI\_ref}$$ [Mathematical Expression 1]

In Mathematical Expression 1, for semi-persistent and periodic reporting, $n_{CQI\_ref}$ may be a value corresponding to a downlink slot closest to n and greater than or equal to $4 \cdot 2^{min(\mu DL, \mu UL)}$ when one CSI-RS resource for channel measurement is configured, and $5 \cdot 2^{min(\mu DL, \mu UL)}$ when a plurality of CSI-RS resources are configured for channel measurement. Constants μDL and μUL may be values indicating how many times of 15 kHz the subcarrier spacing of each downlink and uplink is.

In Mathematical Expression 1, for aperiodic reporting, $n_{CQI\_ref}$ may indicate a downlink slot in which a CSI request is transmitted when channel state information reporting is configured to be performed in the same slot as the downlink slot in which a CSI request is transmitted.

Otherwise, $n_{CQI\_ref}$ may be a value corresponding to a downlink slot closest to n and greater than or equal to a time needed for the UE to calculate CSI.

According to an embodiment of the disclosure, in the channel state information report, the UE may report channel state information measured based on a CSI-RS resource (7-15) at the same time as or a previous time of a CSI reference resource corresponding to the channel state information report.

According to an embodiment of the disclosure, the base station may schedule a PDSCH in the UE considering the channel state information, the amount of data to be transmitted to the UE, and the like, and then notify the UE of scheduling information through downlink control information (DCI). The notified DCI may include the number of layers of scheduled downlink data and the location on the frequency-time axis.

In the following description, the DCI notified by the base station to the UE during the downlink data scheduling in the 5G NR system is described in detail.

In the NR system, Scheduling information about PDSCH may be transmitted through the DCI from the base station to the UE. The UE may monitor a DCI format for fallback and a DCI format for non-fallback with respect to PUSCH or PDSCH. The fallback DCI format may include a predefined fixed field between the base station and the UE. The non-fallback DCI format may include a configurable field.

The DCI may be transmitted through PDCCH after a channel coding and modulation process. A cyclic redundancy check (CRC) may be attached to a DCI message payload.

The CRC may be scrambled by a radio network temporary identifier (RNTI) corresponding to the identification of the UE. Different RNTIs may be used according to the purpose of a DCI message, for example, UE-specific data transmission, a power control command, a random access response, and the like. In other words, the RNTI may be transmitted by being included in a CRC calculation process, without being explicitly transmitted. When the UE receives a DCI message transmitted on a PDCCH, the UE may check CRC by using the assigned RNTI. When a CRC check result is correct, the UE may see that the message has been transmitted to the UE.

According to an embodiment of the disclosure, the DCI that scheduled a PDSCH regarding system information (SI) may be scrambled by an SI-RNTI. The DCI that schedules a PDSCH regarding a random access response (RAR) message may be scrambled by RA-RNTI. The DCI that schedules a PDSCH regarding a paging message may be scrambled by P-RNTI. The DCI that notifies a slot format indicator (SFI) may be scrambled by SFI-RNTI. The DCI that notifies transmit power control (TPC) may be scrambled by TPC-RNTI. The DCI that schedules a UE-specific PDSCH or PUSCH may be scrambled by cell RNTI (C-RNTI).

DCI format 1_0 may be used as a fallback DCI for scheduling a PDSCH, and in this state, a CRC may be scrambled by C-RNTI. DCI format 1_0 in which CRC is scrambled by C-RNTI may include, for example, the following pieces of information.

TABLE 2

Identifier for DCI formats - 1 bit
Frequency domain resource assignment
Time domain resource assignment - 4 bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - 2 bits
PUCCH resource indicator - 3 bits
PDSCH-to-HARQ_feedback timing indicator - 3 bits DCI format 1_1 may be used as non-fallback DCI for scheduling a PDSCH, and in this state, CRC may be scrambled by C-RNTI. DCI format 1_1 in which CRC is scrambled by C-RNTI may include, for example, the following pieces of information.

TABLE 3

Indentifier for DCI formats - 1 bits
    Carrier indicator - 0 or 3 bits
    Bandwidth part indicator - 0, 1 or 2 bits
    Frequency domain resource assignment
    Time domain resource assignment - 0. 1. 2, 3, or 4 bits
    VRB-to-PRB mapping - 0 or 1 bit
    PRB bundling size indicator - 0 or 1 bit
    Rate matching indicator - 0, 1, or 2 bits
    ZP CSI-RS trigger - 0, 1, or 2 bits
For transport block 1
    Modulation and coding scheme - 5 bits
    New data indicator - 1 bit
    Redundancy version - 2 bits
For transport block 2
    Modulation and coding scheme - 5 bits
    New data indicator - 1 bit
    Redundancy version - 2 bits
    HARQ process number - 4 bits
    Downlink assignment index - 0 or 2 or 4 bits
    TPC command for scheduled PUCCH - 2 bits
    PUCCH resource indicator - 3 bits
    PDSCH-to-HARQ_feedback timing indicator - 0, 1, 2, 3 bits
    Antenna ports - 4, 5 or 6 bits
    Transmission configuration indication - 0 or 3 bits
    SRS request - 2 bits
    CBG transmission - 0, 2, 4, 6, or 8 bits
    CBG flushing out information - 0 or 1 bit
    DMRS sequence initialization - 1 bit A bandwidth part indicator of Table 3 may mean an indicator indicating a bandwidth part to which scheduled data belongs. When the UE does not support a change of a bandwidth part to DCI, the indicator may be negligible. A bit number for the indicator and bandwidth part mapping corresponding to an indicator value may be configured through higher layer signaling, that is, radio resource control (RRC) signaling.

The base station may notify the UE of a demodulation reference signal (DMRS) port for scheduled data decoding through an antenna ports item of Table 3.

According to an embodiment of the disclosure, when a DMRS type is configured to be type 1 through higher layer signaling, that is, RRC signaling, and the number of DMRS symbols is configured to be 1, a DMRS port corresponding to each codepoint of the antenna ports item on DCI may be the same as Table 4 below.

TABLE 4

| Value | Number of DMRS CDM group(s) without data | DMRS port(s) |
| --- | --- | --- |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

According to an embodiment of the disclosure, the UE may expect that PDSCH layers may exist as many as the codepoint of the DMRS port number corresponding to the codepoint of the antenna ports item on DCI, and decode data of each layer based on the DMRS.

For the UE to successfully receive a PDSCH having a plurality of layers, receiving antenna ports at least as many as or greater than the number of layers may be needed. When the base station knows the maximum receivable layer number of the UE or the receiving antenna number of the UE, the base station may determine the maximum layer number of PDSCHs according thereto. According to some embodiments, before the establishment of RRC connection/reconnection is completed, the UE may report, to the base station, the maximum receivable layer number $n_{max}$ through a UE capability report.

As described above, the layer number of PDSCH to be received by the UE may be notified as DCI, which may be dynamically changed. Accordingly, in order for the UE to successfully receive PDSCH, during the UE capability report, a receiving antenna port number corresponding to the $n_{max}$ layer number reported to the base station is always activated.

In the 5G NR system, in a specific band, the UE may support at least four receiving antenna ports, and a band designated in a particular embodiment, that is, NR bands of n7, n38, n41, n77, n78, n79, and the like, which are agreed in the 3GPP RAN standard meeting, may be included in the band. When the UE using the band is always operated with at least four receiving antenna ports, a large amount of UE power may be unnecessarily used.

When some of the UE receiving antenna ports are to be deactivated for reasons such as UE consuming power reduction, and the like, the base station may notify to deactivate some of the receiving antenna ports of the UE, and when necessary, the base station may notify to reactivate the deactivated receiving antenna ports, so that the UE may operate according to the notifications. The above-described operation may be applied to the band and the minimum receiving antenna port number that are not mentioned in the disclosure.

Furthermore, the base station and the UE may configure a process of measuring and reporting a channel state (channel state information; CSI) from the base station to the UE for each case of a receiving antenna port state of the UE, that is, the UE may deactivate or activate some of the receiving antenna ports. The channel state may be referred to when the base station determines when to deactivate or activate some of the UE receiving antenna ports.

A series of operations related to the above-described deactivation/activation of some of the UE receiving antenna ports are different form a series of processes related to the deactivation/activation of some of the transmitting antenna ports of the base station. First, the base station may make a self-decision to deactivate/activate some of the transmitting antenna ports thereof. In contrast, the UE may not make a self-decision to deactivate/activate some of the receiving antenna ports because the number of PDSCH layers, that is, the number of minimum receiving antennas needed for PDSCH receiving is dynamically determined through DCI. Accordingly, the UE may need an explicit or implicit deactivation/activation notification from the base station.

Furthermore, a series of operations related to the deactivation/activation of some of the UE receiving antenna ports is different from a series of processes related to the deactivation/activation of some of the UE transmitting antenna ports. A channel state from each of the UE transmitting antenna ports to the base station receiving antenna ports may be measured by the base station through a sounding reference symbol (SRS) reference signal transmitted by the UE. In contrast, a method of receiving a report of UE channel state information from the base station with respect to the state of each of the UE receiving antenna ports is not currently established in the 5G NR standard.

Accordingly, an operation related to the notification of the deactivation/activation state of the UE receiving antenna ports and the channel state measurement and report regarding each deactivation/activation state needs to be supported. An embodiment regarding detailed operation methods in higher and physical layers to support the above-described operation is described below.

First Embodiment: Band Selection Process of Receiving Control Information and Data at Initial Access of UE The base station and the UE may know the minimum number of UE receiving antenna ports with respect to each of available bands. Information about the minimum number of UE receiving antenna ports for each band may be recorded by hardware, software, or a combination of hardware/software of the base station and the UE.

When the UE knows the minimum number of UE receiving antenna ports for each band, the UE may compare the UE receiving antenna port number (hereinafter, $n_{RX}$) with the minimum number of UE receiving antenna ports for each band (hereinafter, $n_{RX,min}^b$, the superscript "b" denotes an index of a band) and use only a band b satisfying the following mathematical expression for an initial access process to the base station, or for receiving control information and data from the base station, carrier switching, or carrier aggregation after the initial access. The band may be one or more bands.

$$n_{RX} \geq n_{RX,min}^b \quad \text{[Mathematical Expression 2]}$$

The initial access process, as in the current 5G NR system, may include frequency tuning to an available band among bands, receiving a signal such as a synchronization signal block (SSB), and the like from one or multiple base stations in a band and signal strength measurement, selecting a base station to access and receiving a random access response (RAR) and an RRC message from the base station, and the like.

The minimum number of UE receiving antenna ports for each band in the first embodiment may be 4 ports, and the band may include n7, n38, n41, n77, n78, and n79 that are NR bands. In this case, only when the number of UE receiving antenna ports $n_{RX}$ is 4 or more, the band may be used for the initial access, control information and data receiving, carrier switching, or carrier aggregation after the initial access.

The base station may deactivate some of the $n_{RX}$ number of UE receiving antenna ports for reasons such as UE consuming power reduction, and the like in a band receiving data after the initial access, or activate all or some of deactivated ports. To this end, the base station may consider whether the UE is capable of changing a receiving antenna port deactivation/activation state. In the following embodiment, a method of reporting the UE capability of changing a receiving antenna deactivation/activation state is disclosed.

Second Embodiment: UE Receiving Antenna Port Deactivation/Activation State Changing Capability Report Method The UE may report, to the base station, weather the UE supports changing a receiving antenna port deactivation/activation state by mounting the same on one or two more of an RACH preamble, an RRC connection request, and a UE capability report message before the completion of the establishment of RRC connection/reconnection. The report may be a report regarding a band used through the first embodiment.

According to some embodiments of the disclosure, when a specific UE does not support changing a receiving antenna port deactivation/activation state, the base station may not indicate the UE to change a receiving antenna port deactivation/activation state or may not configure a channel state measurement and report regarding different receiving antenna port deactivation/activation states, thereby reducing unnecessary signaling overhead.

Second-1 Embodiment: UE Receiving Antenna Port Deactivation/Activation State Changing Capability Report Method 1

Figure 8:
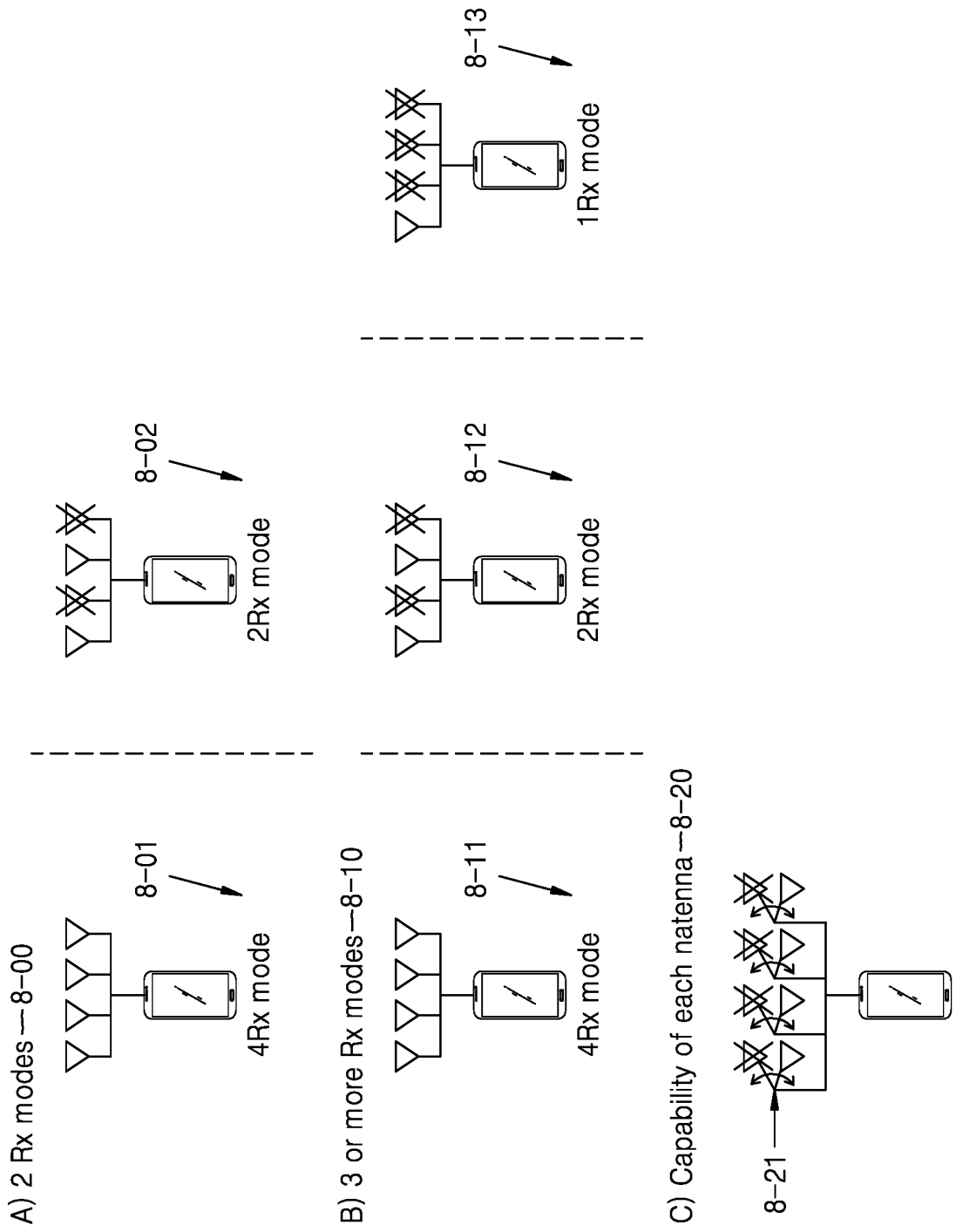
FIG. 8 is a view of an example of a method of reporting a UE reception antenna port deactivation/activation capability, according to an embodiment of the disclosure.

FIG. 8 is a view of examples of a method of reporting a UE receiving antenna port deactivation/activation state changing capability, according to an embodiment of the disclosure.

According to a first example (8-00), the UE may report, to the base station, whether to be capable of supporting switching between two receiving antenna port deactivation/activation states (hereinafter, an Rx mode).

In the above-described example, when the UE is equipped with four receiving antenna ports, a 4 Rx mode (8-01) that is a state in which all receiving antenna ports are activated and a 2 Rx mode (8-02) that is a state in which two of the receiving antenna ports are deactivated are considered.

The UE may report, to the base station, whether to be capable of supporting switching between the respective Rx modes through independent 1 bit (1: switching supported, 0: switching not supported) or a method of multiplexing with other information, and the like. The receiving antenna port deactivated in the 2 Rx mode may be previously promised between the base station and the UE. When the UE does not support switching between the Rx modes, all receiving antenna ports equipped in the UE may be assumed to be always in an activated state.

The above-described UE receiving antenna port number, and the name and meaning of each Rx mode, are merely an example, and the description of the disclosure may be applied to other antenna port numbers and Rx modes.

Second-2 Embodiment: UE Receiving Antenna Port Deactivation/Activation State Changing Capability Report Method 2

A second example (8-10) of FIG. 8 is an example of one of available combinations of Rx modes when there are three or more UE Rx modes described above. For example, when the receiving antenna ports of the UE is four, a total of three Rx modes including a 4 Rx mode (8-11) in which all four ports are activated, a 2 Rx mode (8-12) in which two ports are activated, and a 1Rx mode (8-13) in which one port is activated, may be used. The UE may report, to the base station, whether to be capable of supporting switching between the respective Rx modes, in the method as shown in Table 5.

TABLE 5

| Bit position | Value 1 or 0 |
|---|---|
| $1^{ST}$ bit | 1: Supporting switching to 1 Rx mode |
|  | 0: No supporting switching |
| $2^{nd}$ bit | 1: Supporting switching to 2 Rx mode |
|  | 0: No supporting switching |
| $3^{rd}$ bit (optional) | 1: Supporting switching to 4 Rx mode |
|  | 0: No supporting switching |

According to Table 5, the UE may basically operate in a state in which all receiving antenna ports (four ports in the table) are activated. Accordingly, the UE may basically support a 4 Rx mode and switching from other Rx mode to the 4 Rx mode, and the third bit may be omitted.

The report method example of the above-described four UE receiving antenna ports and 3 Rx modes may be similarly applied to other receiving antenna port numbers and Rx modes. Furthermore, a relationship between the bit location and the Rx mode in a bitmap may vary according to embodiments.

Second-3 Embodiment: UE Receiving Antenna Port Deactivation/Activation State Changing Capability Report Method 3

The UE switching between the Rx modes may be possible for a specific case only depending on the capability of the UE. For example, regarding the 4 Rx mode, the 2 Rx mode, and the 1Rx mode described in the second example (8-10) of FIG. 8, while switching from the 4 Rx mode to the 2 Rx mode is possible, switching from the 4 Rx mode to the 1Rx mode may be impossible. In this case, the UE may report, to the base station, which switching between the Rx modes is supported, in the same method as shown in Table 6.

TABLE 6

|  | To | | |
|---|---|---|---|
| From | 4 Rx mode | 2 Rx mode | 1 Rx mode |
| 4 Rx mode | — | Support | No support |
| 2 Rx mode | Support | — | Support |
| 1 Rx mode | No support | Support | — |

Table 6 shows whether the UE is capable of supporting switching from an Rx mode corresponding to a specific row to an Rx mode corresponding to a specific column. An example of the report method according to Table 6 may be similarly applied to other antenna port numbers and Rx modes.

Second-4 Embodiment: UE Receiving Antenna Port Deactivation/Activation State Changing Capability Report Method 4

A case of reporting whether to be capable of changing a deactivation/activation state for each of the receiving antenna ports of the UE is possible. A third example (8-20) of FIG. 8 is an example in which the UE reports, to the base station, whether to be capable of changing an activation/deactivation state of the receiving antenna port (8-21). According to an embodiment of the disclosure, the UE may report at least one of a total antenna number, the number of antennas that are capable of activation/deactivation switching, or the number of antennas that are incapable of activation/deactivation switching. Alternatively, the UE may report a bitmap such as Table 7 to the base station.

TABLE 7

| Bit position | Value 1 or 0 |
|---|---|
| $1^{st}$ bit | 1: Supporting deactivation/activation switching of $1^{st}$ antenna port |
|  | 0: No supporting switching |
| ... | ... |
| $K^{th}$ bit | 1: Supporting deactivation/activation switching of $K^{th}$ antenna port |
| (K: Total suber of receiving antenna ports of UE) | 0: No supporting switching |

An example of the report method described with reference to Table 7 may be similarly applied to other receiving antenna port numbers. Furthermore, through a method other than the above-described example, the UE may report, to the base station, whether to be capable of changing an activation/deactivation state of the UE receiving antenna port. Whether to be capable of changing a deactivation/activation state of the above-described UE receiving antenna port may be reported to the base station by being mounted on one or two more of an RACH preamble, an RRC connection request, or a UE capability report message, before the completion of the establishment of RRC connection/reconnection.

Third Embodiment: Base Station's Rx Mode Notification Method for UE Data Receiving The base station may use one of Rx modes for UE data receiving, or may notify the UE so that the UE may deactivate or activate one or more receiving antenna ports of the UE.

When the base station receives a report about whether the UE is capable of changing an Rx mode, the base station may consider whether to be capable of changing an Rx mode at an Rx mode notification of UE data receiving.

Third-1 Embodiment: Base Station's Rx Mode Notification Method Through Higher Layer Signaling The base station may use higher layer signaling, such as RRC signaling, as one of methods regarding the Rx mode notification for UE data receiving.

Figure 9:
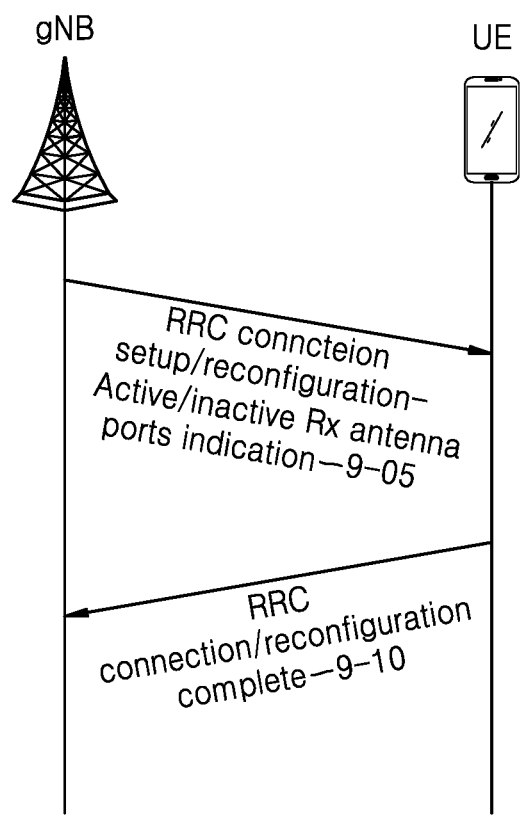
FIG. 9 is a view of an example of a UE Rx mode configuration method through higher layer signaling between a base station and a UE, according to an embodiment of the disclosure.

FIG. 9 is a view of a RRC connection configuration or reconfiguration process between a base station and a UE, according to an embodiment of the disclosure. The base station may notify the UE of whether to change a UE receiving antenna port deactivation/activation state, as one method of examples described below, through a RRC connection configuration or reconfiguration notification (9-05). According to an embodiment of the disclosure, the base station may notify the UE of the enumerated values of available Rx modes of the UE, for example, {1Rx mode, 2 Rx mode, 4 Rx mode, 8Rx mode, . . . }, {low, medium, . . . highest}, {partial, full}, or one of values or a set of values named in other description methods. According to an embodiment of the disclosure, the base station may notify the UE of a set of UE activation antenna port number, deactivation antenna port number, or available activation/deactivated receiving antenna port number. According to an embodiment of the disclosure, the base station may notify the UE of UE activated receiving antenna port number or deactivated receiving antenna port number, by using the bitmap of Table 8.

TABLE 8

| Bit position | Value 1 or 0 |
|---|---|
| $1^{st}$ bit | 1: $1^{st}$ receiving antenna port activation<br>0: $1^{st}$ receiving antenna port deactivation |
| ...<br>$K^{th}$ bit | ...<br>1: $K^{th}$ receiving antenna port activation<br>0: $K^{th}$ receiving antenna port deactivation |

In Table 8, the receiving antenna port activation/deactivation and mapping between bits I/O may be changed. For example, bit 1 may mean receiving antenna port deactivation, and bit 0 may mean receiving antenna port activation.

According to an embodiment of the disclosure, the base station may notify whether to change Rx mode for UE data receiving semi-statically or dynamic, through the RRC connection configuration or reconfiguration notification. When the base station notifies to change an Rx mode semi-statically, the notification may be notified with one of the enumerated values of the above-described Rx mode. Furthermore, when the base station notifies the UE Rx mode dynamically, a third-2 embodiment described below may be used together. The base station may notify whether to change the UE Rx mode through the RRC connection configuration or reconfiguration notification, by a method other than the above-described example.

The UE may notify the base station that the RRC connection configuration/reconfiguration notification including data receiving Rx mode information is has normally received (9-10). The UE may maintain the receiving antenna port deactivation/activation state (hereinafter, Rx mode) configuration configured by RRC, before the time point of the RRC reconfiguration.

Third-2 Embodiment: Base Station's UE Rx Mode Notification Method Through MAC CE or DCI As another method of the Rx mode notification for UE data receiving, the base station may use a media access control element (MAC CE) or DCI. The base station may notify the UE of whether to change the UE Rx mode, through MAC CE or DCI, by one method of examples described below.

According to an embodiment of the disclosure, the base station may notify the UE one of indexes 0/1/2/ . . . indicating UE available Rx modes, or a set of values. Each of the indexes 0/1/2/ . . . may indicate the 1Rx mode, the 2 Rx mode, the 4 Rx mode, . . . , which are mentioned in an embodiment of the disclosure. According to an embodiment of the disclosure, the base station may notify the UE a set of available Rx modes by RRC, and notify the UE one Rx mode of the set through MAC CE/DCI. Furthermore, the base station may notify the UE a set of available Rx modes through MAC CE, and one Rx mode of the set through DCI.

In MAC CE or DCI, a configuration of an Rx mode for UE data receiving may be notified by a method similar to or different from a method described with reference to the third-1 embodiment, through an exclusive field containing the configuration only. Alternatively, a configuration of a deactivation/activation state of the UE receiving antenna port may be notified to the UE by being multiplexed with an existing field on MAC CE or DCI.

For example, according to the following Third-3 embodiment, when the UE receives a different Rx mode configuration for each bandwidth part (BWP), through a "bandwidth part indicator" field on DCI, a BWP configuration and a UE Rx mode configuration together may be notified to the UE.

Alternatively, according to the following Fourth-6 embodiment, a UE CSI report setting and a UE Rx mode configuration for trigger of a PUSCH semi-persistent CSI report and an aperiodic CSI report, may be notified together to the UE, through a "CSI request" field on DCI.

Third-3 Embodiment: UE Rx Mode Notification Method for Each Bandwidth

The UE may independently configure an Rx mode for receiving data for each bandwidth, for example, a component carrier (CC), BWP, and the like.

Figure 10:
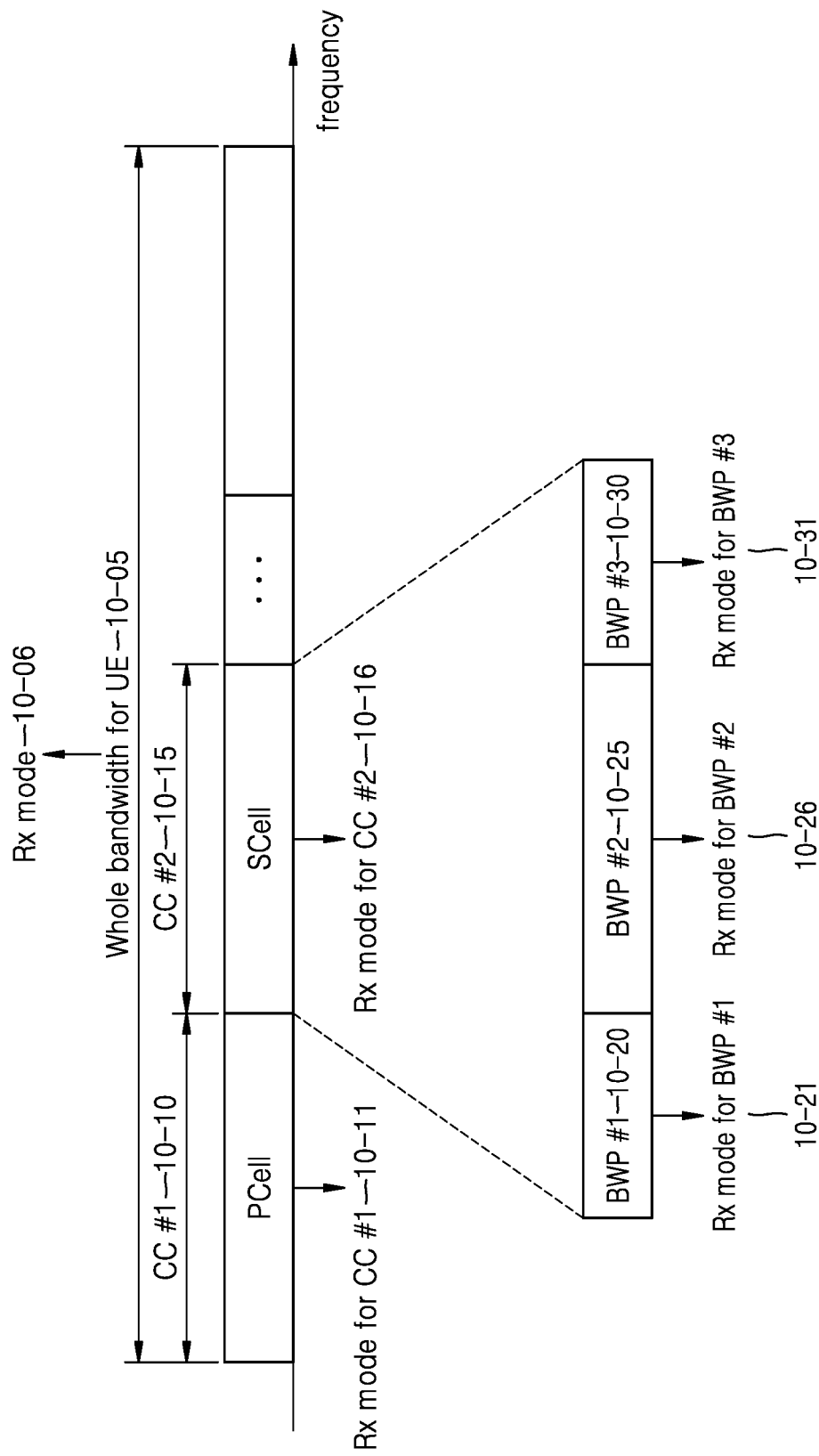
FIG. 10 is a view of an example of a UE Rx mode configuration method for each bandwidth, according to an embodiment of the disclosure.

FIG. 10 is a view of UE Rx mode configuration for each bandwidth.

According to an embodiment of the disclosure, the base station may indicate one Rx mode (10-06) to the UE with respect to the whole UE bandwidth (10-05) according to the method of the third-1 embodiment.

According to an embodiment of the disclosure, the base station may indicate independent Rx modes (10-11, 10-16) respectively to UE CCs (10-10, 10-15) through higher layer signaling such as RRC, and the like.

According to an embodiment of the disclosure, the base station may indicate independent Rx modes (10-21, 10-26, 10-31) for each BWP (10-20, 10-25, 10-30) in the UE CC, through higher layer signaling such as RRC, and the like.

A method of indicating an Rx mode according to each CC or BWP may be similar to the method described with reference to the third-1 embodiment.

When the UE is notified of a different Rx mode according to the CC or BWP, the Rx mode may be changed by changing the CC or BWP used by the UE, through DCI, MAC CE, and the like. In this state, the DCI may be a BWP indicator.

Third-4 Embodiment: UE Rx Mode Notification Method for Each Slot

Figure 11:
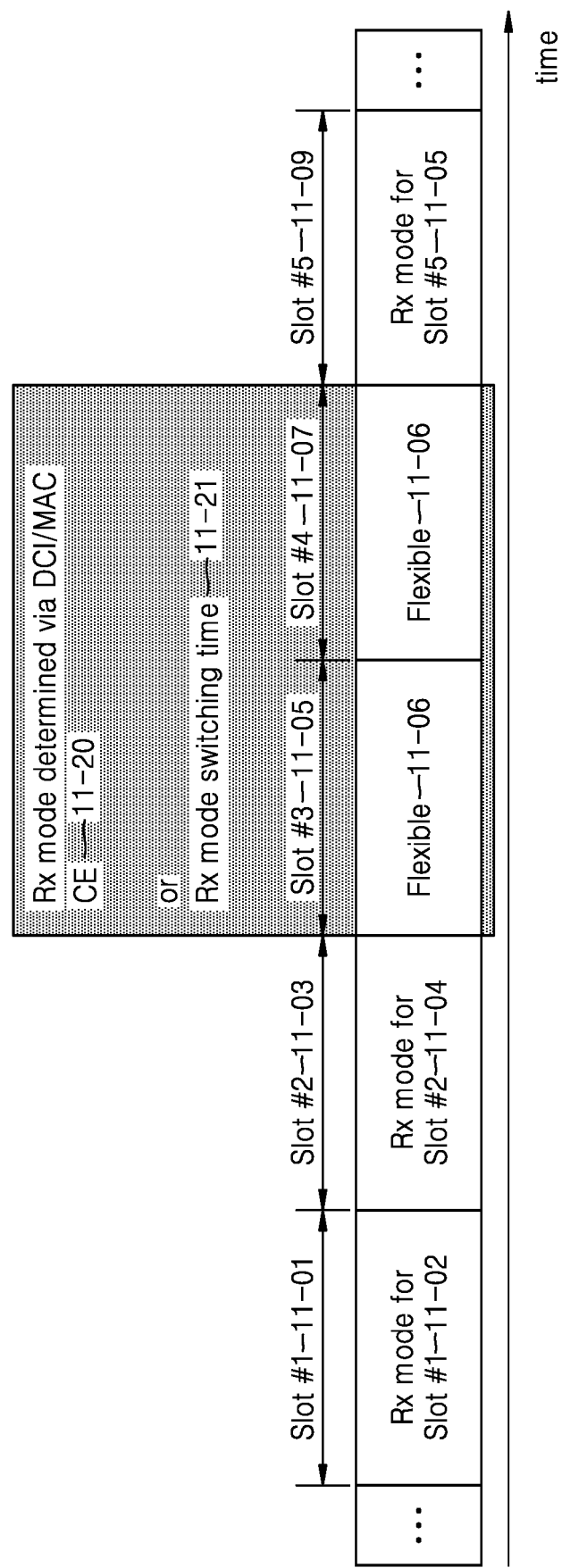
FIG. 11 is a view of an example of a UE Rx mode configuration method for each slot, according to an embodiment of the disclosure.

FIG. 11 is a view of an Rx mode configuration for each slot for UE data receiving.

The base station may have different Rx modes (11-02, 11-04, 11-06, 11-10) for each of UE each slots (11-01, 11-03, 11-05, 11-07, 11-09), through higher layer signaling such as RRC, and the like.

As a notification method regarding an Rx mode for each slot, there may be a method of indicating an Rx mode for each slot, through the method described with reference to the third-1 embodiment. Alternatively, the Rx mode configuration for each slot may be notified by a method of indicating the slot number and offset at which a specific Rx mode is maintained.

The specific slot may be assigned to be a flexible (11-06), and for the slot, the Rx mode may be dynamically determined through MAC CE or DCI, and the like, as in the third-2 embodiment (11-20).

Alternatively, the slot may be used as a switching time (11-21) that is needed for changing the Rx mode.

Fourth Embodiment: Rx Mode Configuration Method for Channel State Estimation and Report According to an embodiment of the disclosure, the base station may use channel state information about each Rx mode to determine at what time point the Rx mode for UE data receiving is changed.

According to an embodiment of the disclosure, the base station may configure a CSI-RS resource to transmit, and configure one or more Rx modes in which the UE receives the CSI-RS resource, or one or more reference Rx modes to report channel state information such as CRI, RI, CQI, and the like. The UE may measure and report a channel state according to the base station's configuration of the CSI-RS resource receiving Rx mode or the reference Rx mode to report channel state information.

The base station may explicitly indicate the above-described the UE Rx mode for receiving a CSI-RS resource or the reference Rx mode for channel state information report. According to an embodiment of the disclosure, the base station may include an RX mode in the framework configuration regarding the UE channel state measurement and the channel state information report of FIG. 6. The framework configuration related to the channel state measurement and the channel state report may be indicated through RRC.

The below-described fourth-1 to fourth-6 embodiments are examples regarding a method of configuring, by the base station, each constituent element on a channel state information framework to obtain channel state information about a specific Rx mode.

Fourth-1 Embodiment: CSI-RS Resource Set Configuration

Figure 12:
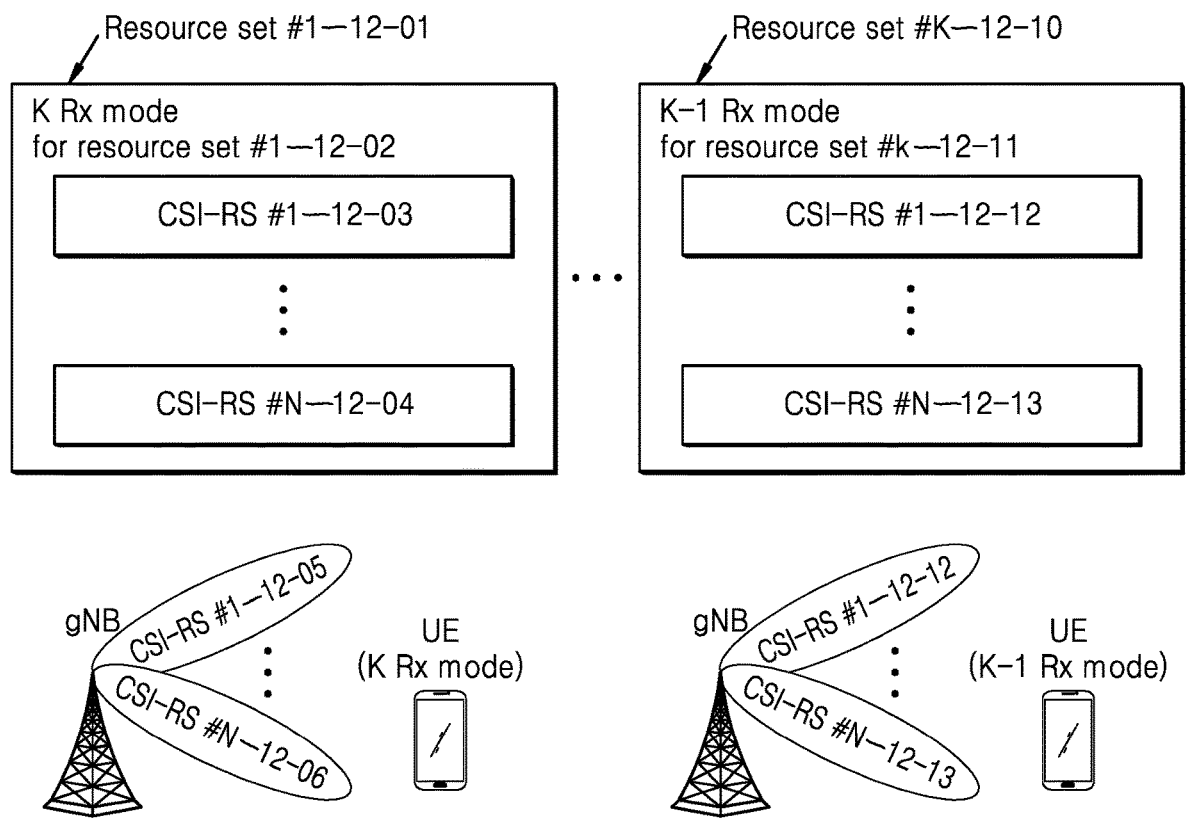
FIG. 12 is a view of an example of a CSI-RS resource set configuration, according to an embodiment of the disclosure.

FIG. 12 is a view of an example of a method of indicating, by the base station, the UE in which Rx mode the UE receives a CSI-RS resource, through each CSI-RS resource set (12-01, 12-10) on a channel state information framework.

According to an embodiment of the disclosure, the UE may change an RX mode thereof to receive each CSI-RS resource (12-03, 12-04 or 12-12, 12-13) belonging to a CSI-RS resource set, in the Rx mode indicated in 12-02 or 12-11. A CSI-RS resource set configuration may be indicated to the UE through RRC. The UE may maintain the configuration before the time point of an RRC reconfiguration.

According to an embodiment of the disclosure, the base station may configure each CSI-RS resource set with a different Rx mode (12-02, 12-11). After configuring an Rx mode to each CSI-RS resource set, the UE may receive CSI-RS belonging to the CSI-RS resource set and measure a channel state regarding the configured Rx mode. The UE may report to the base station an optimal RX mode by reporting an index of a CSI-RS resource set corresponding to an RX mode having an optimal channel state, among the measured channel state of each Rx mode. For the CSI-RS resource set index report, the base station may add the CSI-RS resource set index to CSI quantity to report at the time of the CSI report setting.

According to an embodiment of the disclosure, the base station may map a different transmission beam or receiving beam to each CSI-RS resource belonging to one or more CSI-RS resource sets. According to an embodiment of the disclosure, a different transmission beam may be mapped to each of CSI-RS resource #1 (12-05), . . . CSI-RS resource #N (12-06), with respect to a CSI-RS resource set #1 (12-01) configured with a K Rx mode. After receiving each CSI-RS resource in the Rx mode designated in the CSI-RS resource set configuration, the UE may measure the channel state of each of the received CSI-RS resources. With respect to the Rx mode configured in each resource set, a CSI-RS resource indicator (CRI) indicating a CSI-RS resource corresponding to an optimal channel state may be reported to the base station. The base station may find an optimal transmitting/receiving beam to each Rx mode through CRI for each of the reported CSI-RS resource set.

Fourth-2 Embodiment: CSI-RS Resource Setting

According to an embodiment of the disclosure, an indication regarding in which Rx mode the UE receives a CSI-RS resource may be transmitted through the CSI-RS resource setting included in the CSI-RS resource set on the channel state information framework.

Figure 13:
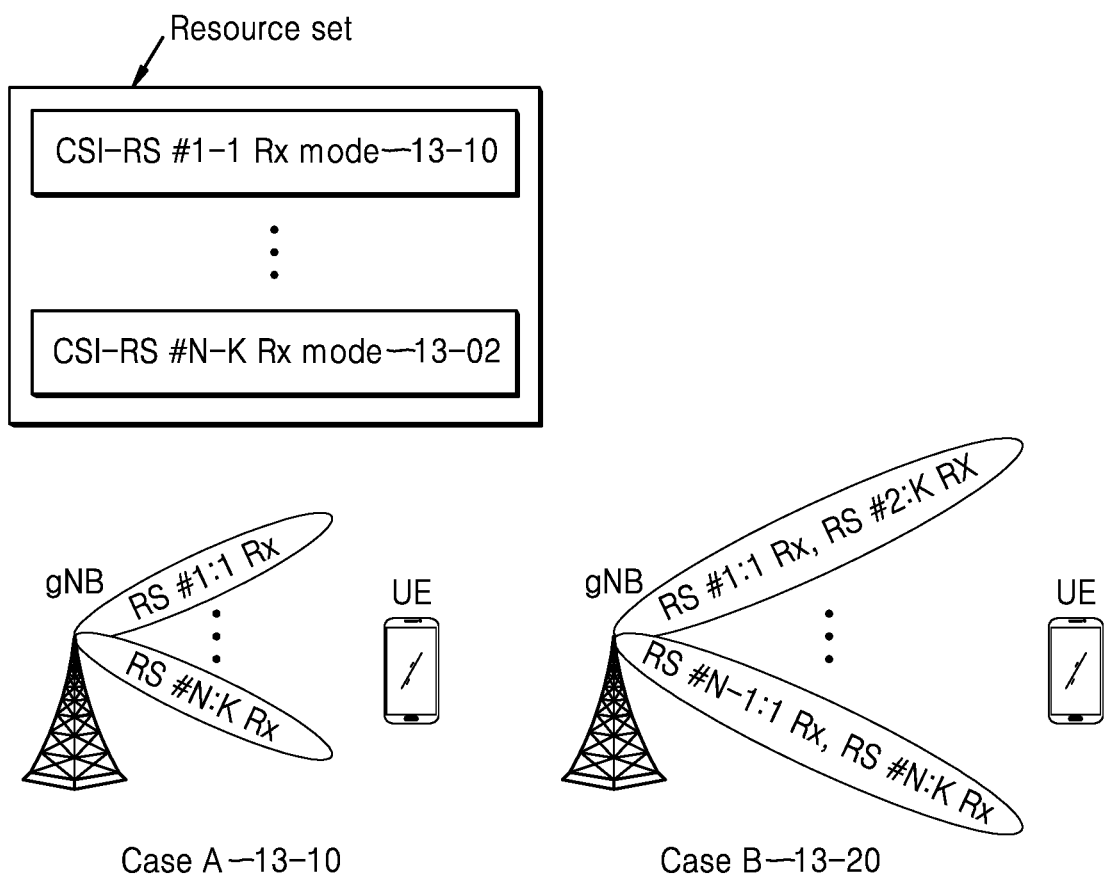
FIG. 13 is a view of an example of a CSI-RS resource setting, according to an embodiment of the disclosure.

FIG. 13 is a view of an example that a UE Rx mode (13-01, 13-02) is indicated in each CSI-RS resource setting.

According to an embodiment of the disclosure, the base station may indicate a different Rx mode for each CSI-RS resource setting, and some or all CSI-RS resource settings may indicate the same Rx mode. The UE may change an RX mode thereof to receive each CSI-RS resource in the Rx mode indicated in the resource setting. The UE may determine a time to change an RX mode for receiving a CSI-RS resource considering a time for changing an Rx mode. The UE may indicated of the CSI-RS resource setting through RRC. The UE may maintain the configuration until the time of RRC reconfiguration.

According to an embodiment of the disclosure, the base station may map a different transmitting/receiving beam in each CSI-RS resource (13-10). Alternatively, the base station may map a CSI-RS resource to be received by the UE in one or more different Rx modes, in one transmitting/receiving beam (13-20).

According to an embodiment of the disclosure, the UE may measure the channel state of each CSI-RS resource received after receiving each CSI-RS resource according to the designated transmitting/receiving beam configuration and Rx mode configuration. The UE may report to the base station CRI indicating a CSI-RS resource corresponding to the optimal channel state. As the base station knows both of the optimal transmitting/receiving beam and the optimal Rx mode through the reported CRI, in the embodiment, additional CSI quantity for the optimal Rx mode report is unnecessary.

Fourth-3 Embodiment: CSI Resource Setting Configuration

According to an embodiment of the disclosure, an indication regarding in which Rx mode the UE receives a CSI-RS resource may be transmitted through the CSI resource setting on the channel state information framework. The configuration may be commonly applied to each resource in each resource set belonging to the resource setting and each resource in the resource set, as described with reference to FIG. 5.

According to an embodiment of the disclosure, to receive each CSI-RS resource belonging to the UE CSI resource setting in the Rx mode indicated in the resource setting, the UE may change an Rx mode thereof. The UE may determine the time to change an Rx mode for receiving a CSI-RS resource considering a time for changing the Rx mode. The UE may be indicated of a CSI resource setting configuration through RRC. The UE may maintain the configuration before the time point of RRC reconfiguration.

Fourth-4 Embodiment: CSI Report Setting Configuration

According to an embodiment of the disclosure, it may be possible to indicate to report to the base station in which Rx mode the CSI is measured, not to indicate in which Rx mode the CSI-RS resource is received. In this case, the UE may flexibly configure an Rx mode for receiving CSI-RS resource. An indication to report regarding in which Rx mode channel state information is measured may be transmitted through the CSI report setting on the channel state information framework.

According to an embodiment of the disclosure, one report setting may be linked with one or more resource setting, as described with reference to FIG. 5. Accordingly, the report setting may be linked with a resource set included in the resource setting and a resource included in the resource set.

Figure 14:
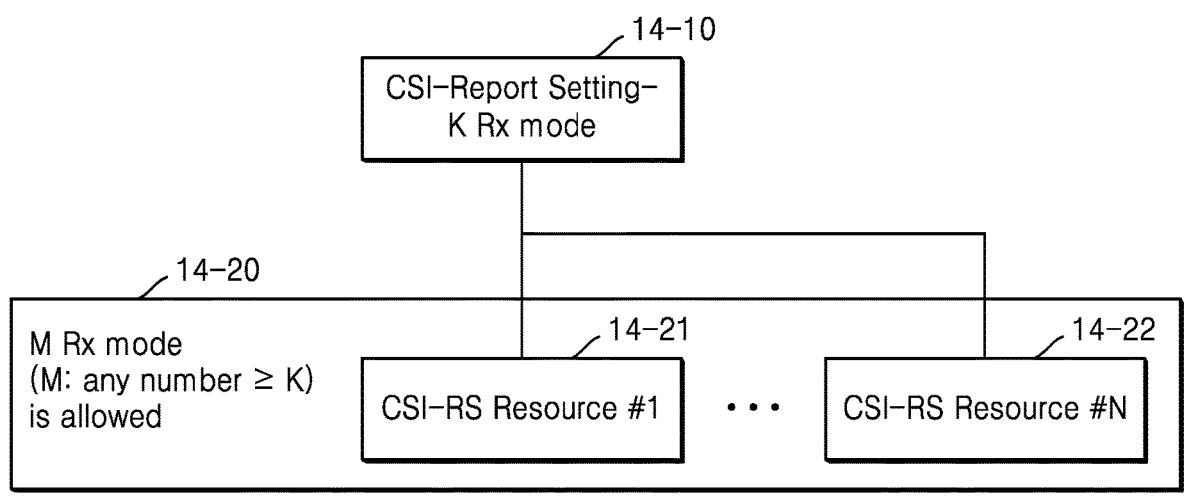
FIG. 14 is a view of an example of a method of configuring a UE reception antenna port based on a CSI report setting, according to an embodiment of the disclosure.

According to an embodiment of the disclosure, the UE may configure an Rx mode thereof for receiving the CSI-RS resource linked with the report setting, to an M Rx mode, as shown in FIG. 14. The UE may measure the channel states of the M Rx mode and all Rx modes smaller than the M Rx mode from the CSI-RS resource received in the M Rx mode.

As illustrated in FIG. 14, when the report setting is configured to report channel state information measured in a K Rx mode (14-10), to receive the each linked CSI-RS resource (14-21, 14-22), the UE may configure a receiving antenna port deactivation/activation state to the M Rx mode. The UE may determine the time to change an Rx mode for receiving a CSI-RS resource considering the time for changing the Rx mode.

The M Rx mode may indicate the K Rx mode and all available Rx modes greater than the K Rx mode, and all available Rx modes may be the Rx mode mentioned in the second-2 or second-3 embodiment. The UE may measure the channel state of the K Rx mode smaller than M through the CSI-RS resource received in the M Rx mode and then report to the base station according to the report setting. The base station may indicate a CSI report setting configuration through RRC UE. The UE may maintain the configuration before the time point of the RRC reconfiguration.

According to an embodiment of the disclosure, the base station may configure a plurality of Rx modes in the CSI report setting configuration. For example, when the report setting is configured to report channel state information about the K Rx mode and a K+1 Rx mode, the connected CSI-RS resource may be received in the M Rx mode (M may indicate all available Rx modes greater than K+1). The UE may measure the respective channel states of the K Rx mode and K+1 Rx mode smaller than M through the CSI-RS resource received in the M Rx mode, and then report to the base station channel state information about the two Rx modes according to the report setting.

Fourth-5 Embodiment: Multiplexing Between Channel State Information Framework Configuration and Rx Mode Configuration According to an embodiment of the disclosure, an indication regarding in which the Rx mode the UE measures a channel state may be transmitted to the UE by being multiplexed with the above-described channel state information framework configuration.

According to an embodiment of the disclosure, the base station may transmit to the UE CSI resource setting or transmission characteristics configuration in the CSI report setting, that is, an aperiodic, semi-persistent, or periodic configuration, by being multiplexed with the Rx mode, as shown in Table 9.

TABLE 9

| UE support | Transmission characteristics | | |
|---|---|---|---|
| Rx mode | Periodic | Semi-persistent | Aperiodic |
| {2 Rx, 4 Rx} | 2 Rx | 2 Rx | 4 Rx |
| {1 Rx, 2 Rx, . . . , K Rx} | 1 Rx | 2 Rx | 1 Rx, 2 Rx, . . . K Rx |
| . . . | . . . | . . . | . . . |

For the UE configured as shown in Table 9, when a supportable Rx mode is {2Rx, 4Rx} and a periodic CSI report setting is configured, the UE may report channel state information about a 2 Rx mode to be periodic.

A multiplexing relationship as shown in Table 9 may be previously promised between the base station and the UE, and may be transmitted to the UE through higher layer signaling such as RRC, and the like. However, Table 9 is merely one example, and may be similarly applied to a multiplexing relationship using other channel state information framework configuration values.

Figure 15:
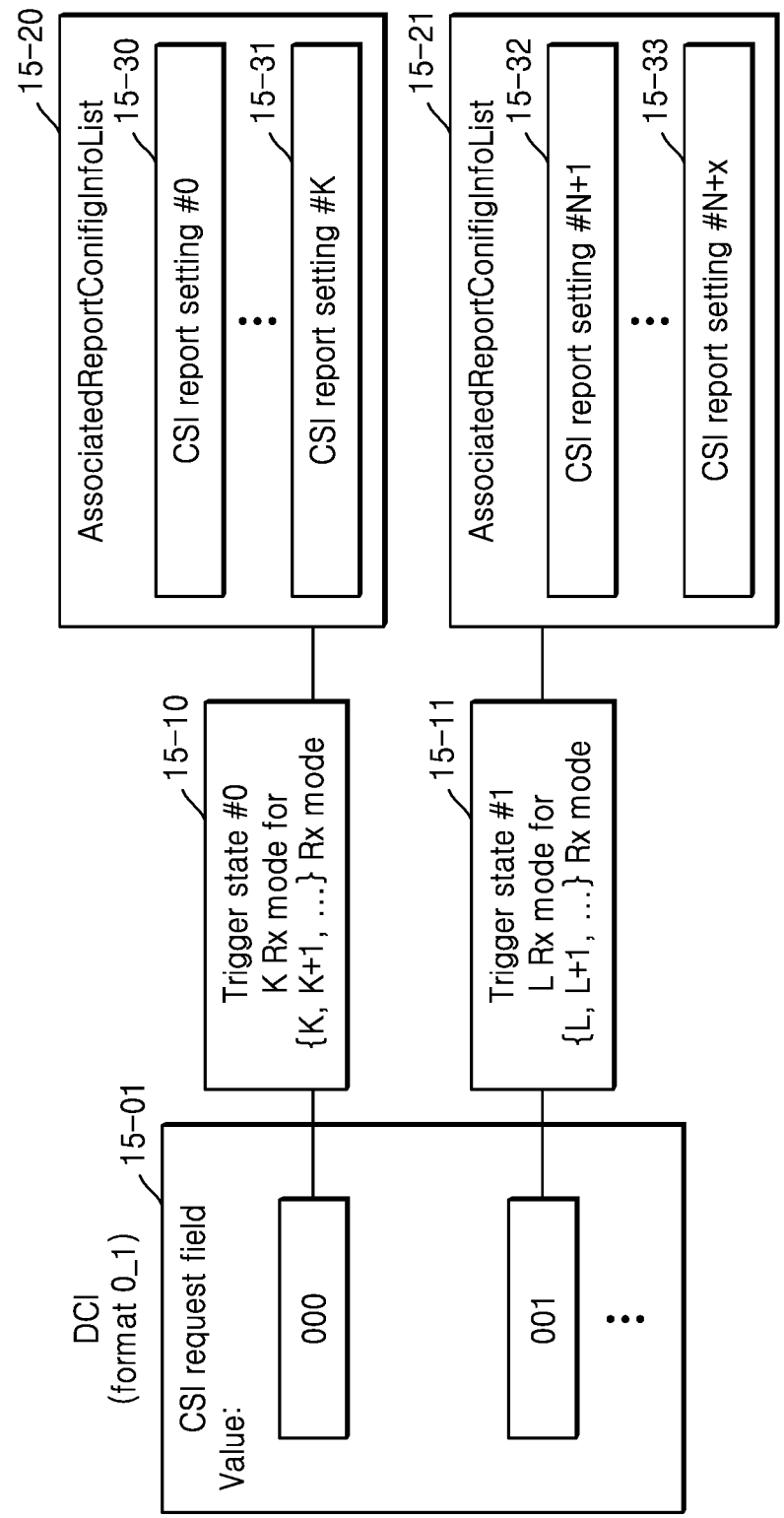
FIG. 15 is a view of an example of a CSI report setting triggered by DCI, according to an embodiment of the disclosure.

Fourth-6 Embodiment: Rx Mode Configuration for Channel State Information Report Trigger As illustrated in FIG. 15, according to an embodiment of the disclosure, in the 5G NR system, a semi-persistent CSI report and an aperiodic CSI report through a physical uplink data channel (PUSCH) may be triggered through a CSI request field (15-01) of a DCI format 0_1.

The CSI request field may be mapped to a trigger state (15-10, 15-11). The trigger state may be associated with a list (15-20, 15-21) of one or more CSI report settings.

The length of a CSI request field, an association relationship between the trigger state and the CSI report setting, and the like may be configured through higher layer signaling such as RRC, and the like.

The base station may configure an Rx mode corresponding to each trigger state (15-10, 15-11) of the CSI report. In this case, in a similar manner in which the Rx mode is configured in the fourth-4 embodiment, the Rx mode for receiving a CSI-RS resource may be configured. Furthermore, an Rx mode for a channel state report may be configured in the same manner as the Rx mode corresponding to the trigger state.

According to an embodiment of the disclosure, the base station may configure a plurality of Rx modes in the CSI trigger state. For example, when the K Rx mode and the K+1 Rx mode are configured in the CSI trigger state, the UE may receive a connected CSI-RS resource set and each CSI-RS resource connected thereto in the M Rx mode (M may indicate all available Rx modes greater than K+1).

The UE may measure the channel state of each of the K Rx mode and the K+1 Rx mode smaller than M through the CSI-RS resource received in the M Rx mode, and then may report to the base station channel state information about the two Rx modes according to the CSI trigger state.

Fifth Embodiment: Implicit Configuration Method of UE Receiving Antenna Port Deactivation/Activation State when Receiving CSI-RS According to a combination of some embodiments of the disclosure, the above-described the UE Rx mode for receiving a CSI-RS resource or the reference Rx mode for channel state information report may be implicitly configured. For example, as a part of the third-1 embodiment, when one UE Rx mode is semi-statically configured through RRC, the UE Rx mode for receiving a CSI-RS resource may be configured in the same manner as the UE Rx mode configured through RRC, and the configuration may be maintained before the RRC reconfiguration. Furthermore, like the below-described fourth-1 and fourth-2 embodiments, and the like, at the time point of CSI-RS resource receiving, the Rx mode configured in the UE may be used without change as an Rx mode for receiving a CSI-RS resource or channel state measurement.

Fifth-1 Embodiment: Implicit Configuration Method 1 of UE Rx Mode According to Time Point of Receiving CSI-RS Resource or CSI Reference Resource As illustrated in FIG. 16, when the UE Rx mode is determined to be a specific value and then a CSI-RS resource is received, the Rx mode for receiving a CSI-RS resource may be configured to be the same as the Rx mode previously configured in the UE.

Figure 16:
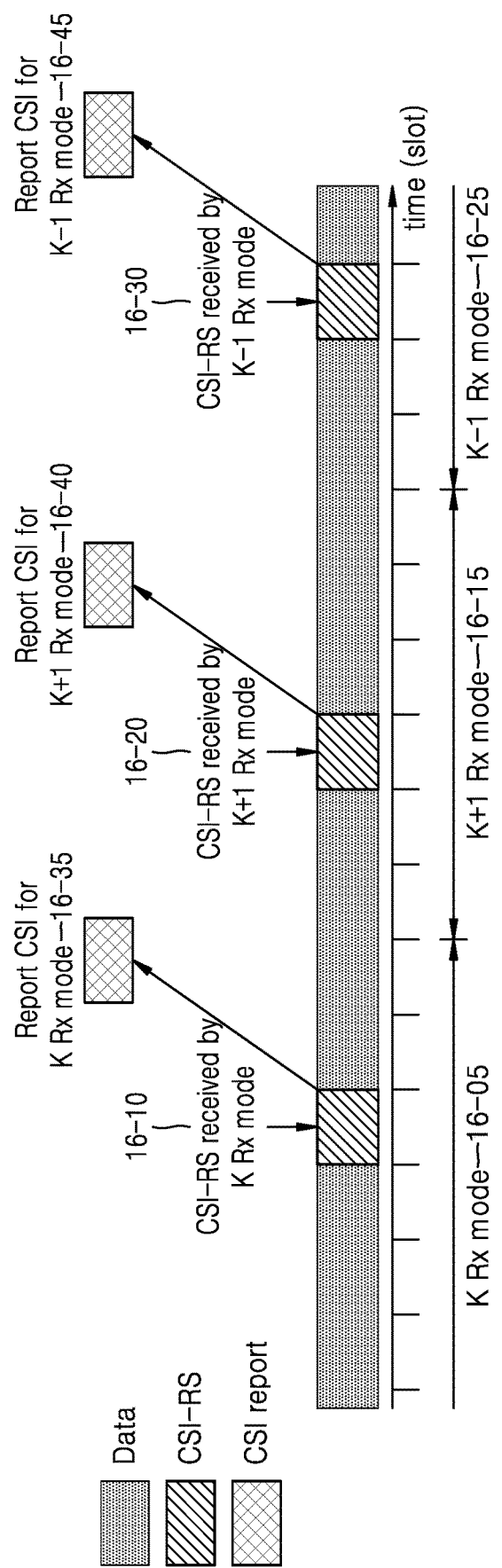
FIGS. 16, 17, and 18 are views of an example of an Rx mode configuration method with respect to CSI-RS receiving or channel state information reporting.

In FIG. 16, when the UE receives the CSI-RS resource in a time section (16-05) configured in the K Rx mode, the UE may receive the CSI-RS resource in the K Rx mode (16-10). When the UE receives the CSI-RS resource within a time section configured with other Rx modes, for example, a K+1 Rx mode section (16-15) or a K−1 Rx mode section (16-25), the UE may configure the Rx mode for receiving a CSI-RS resource to be the same as the Rx mode (K+1 Rx mode or K−1 Rx mode) for a configured time section (16-20 or 16-30). The UE may measure the channel state information about the Rx mode through the CSI-RS resource received in the Rx mode, and then report the channel state information according to the report setting configured by the base station to the base station (16-35, 16-40, 16-45).

When reporting the channel state information to the base station, the UE may report to the base station UE Rx mode information about the measurement of the channel state information together.

Figure 17:
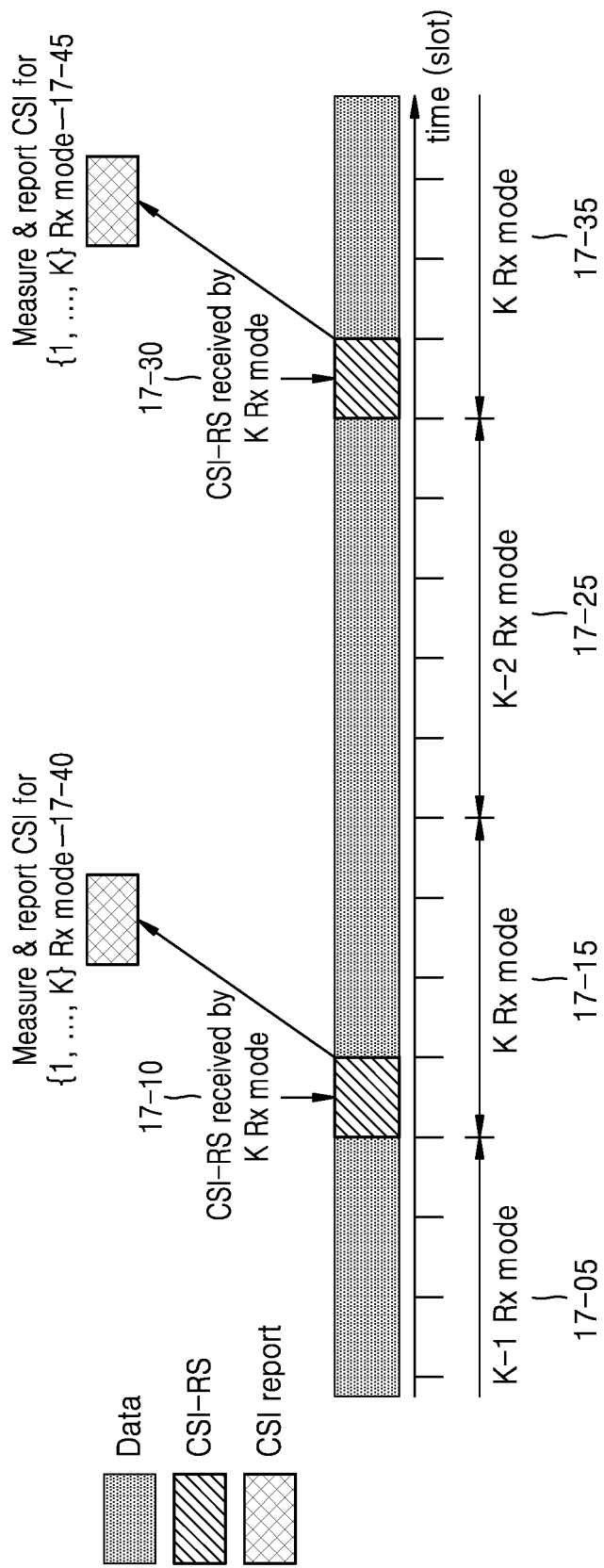

Fifth-2 Embodiment: Implicit Configuration Method 2 of Rx Mode when Receiving CSI-RS Resource According to an embodiment of the disclosure, the UE may use a fixed Rx mode for receiving a CSI-RS resource. In an example, in FIG. 17, the UE may fix the Rx mode for receiving a CSI-RS resource in the K Rx mode (17-15, 17-35), and the K Rx mode may be the maximum Rx mode that the UE reports in the second embodiment. The UE may measure the channel states of the K Rx mode from the CSI-RS resource received in the K Rx mode and all Rx modes smaller than the K Rx mode (17-10, 17-30).

The UE may change an Rx mode thereof before the time point of receiving the CSI-RS resource, for the above-described CSI-RS resource receiving in the Rx mode. Accordingly, before a slot configured to receive the UE CSI-RS resource, a changed from a K−1 Rx mode (17-05) or a K−2 Rx mode (17-25), or other Rx modes, to a K Rx mode (17-15, 17-35) may be performed. The UE may determine an Rx mode for receiving a CSI-RS resource change start time point, considering the time for changing the Rx mode.

In the changed K Rx mode (17-15, 17-35), after receiving the CSI-RS resource, the UE may measure the channel states of all {1, . . . K} Rx modes (17-40, 17-45) and report the measured channel state information.

When the UE measures the channel states of a plurality of Rx modes, the UE may independently report each channel state information to the base station, or report all pieces of channel state information at once to the base station.

Fifth-3 Embodiment: Implicit Configuration Method 3 of Rx Mode when Receiving CSI-RS Resource According to the third-3 embodiment of the disclosure, the UE may independently configure the Rx mode for receiving data with respect to each bandwidth (CC, BWP, and the like). In this state, when the CSI-RS resource is received for each bandwidth, the Rx mode for receiving a resource may be configured in the same manner as the Rx mode for receiving data.

In other words, the Rx mode for receiving a resource may be implicitly configured according to a band for receiving a CSI-RS resource. The base station may independently configure the CSI-RS resource transmission for each band and the channel state information framework for a channel state report. The information about a band configured on the framework may be included in the CSI resource setting.

Fifth-4 Embodiment: Implicit Configuration Method 1 of UE Rx Mode According to Time Point of CSI Reference Resource An Rx mode for reporting channel state information may be configured based on the Rx mode for receiving a CSI-RS resource or the Rx mode for CSI reference resource, not the CSI-RS resource.

Figure 18:
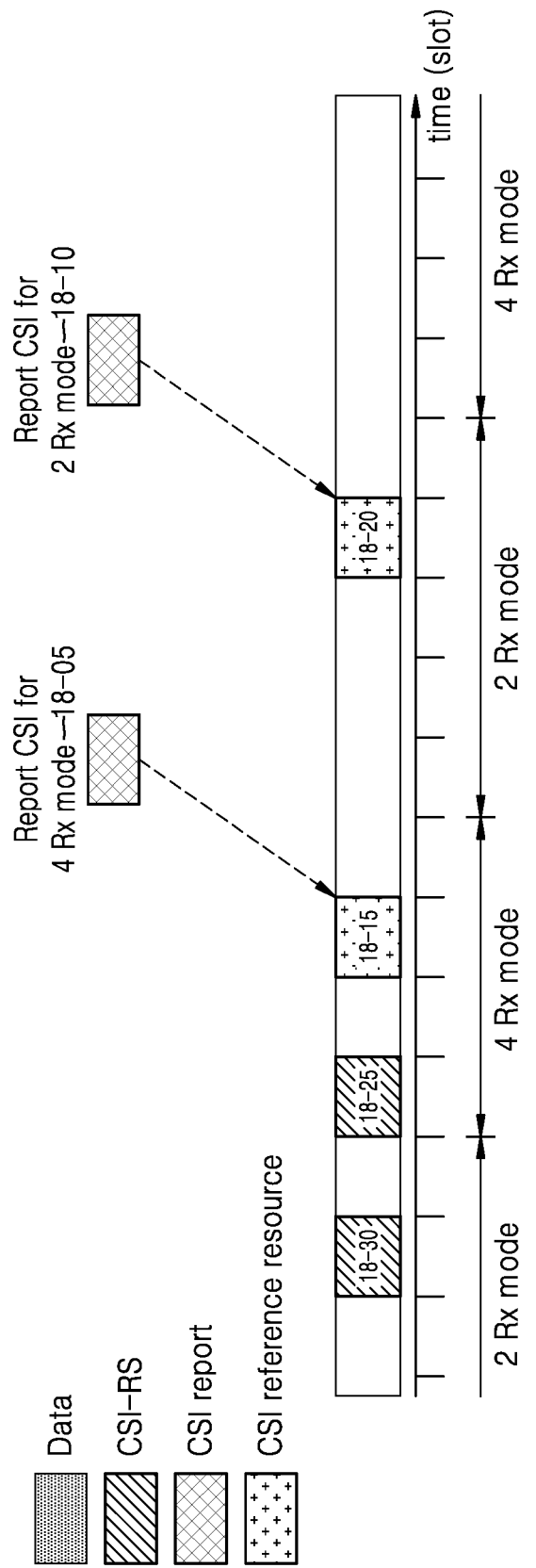

In an example, in FIG. 18, when the UE is configured to be in a 4 Rx mode during a section to which a CSI reference resource (18-15) corresponding to a first channel state information report (18-05) belongs, the UE may report channel state information about CSI reference resource (18-15) in the 4 Rx mode during the first channel state information report (18-05). Furthermore, when the UE is configured to be in a 2 Rx mode during a section to which a CSI reference resource (18-20) corresponding to a second channel state information report (18-10) belongs, the UE may report channel state information about the CSI reference resource (18-20) in the 2 Rx mode during the second channel state information report (18-10).

A method of selecting a reference CSI-RS resource to measure channel state information may include one or more methods. In an example, in FIG. 18, a reference CSI-RS resource for the second channel state information report (18-10), that is, a 2 Rx mode report, may be a CSI-RS resource (18-25) received in the 4 Rx mode or a CSI-RS resource (18-30) received in the 2 Rx mode. In this case, the UE may measure channel state information about a 2 Rx mode from the CSI-RS resource based on the CSI-RS resource (18-30) that is the same as the Rx mode for reporting channel state information, or the CSI-RS resource (18-25) that is the most recent. At this time, the most recent CSI-RS resource may be located at the same time as or a previous time of the CSI reference resource (18-20) in the time domain.

In contrast, in FIG. 18, a reference CSI-RS resource for the first channel state information report (18-05), that is, a 4 Rx mode report, may be only the CSI-RS resource (18-25) received in the 4 Rx mode, and channel state information may be measured based on the CSI-RS resource. As the channel state information about the 4 Rx mode is not obtainable with the CSI-RS resource (18-30) received in the 2 Rx mode, the CSI-RS resource (18-30) received in the 2 Rx mode may not be used as a basis.

The above-described respective embodiments may be used by being combined with each other according to the necessity and the characteristics of each embodiment. FIGS. 19A to 19D are views of examples of available combinations of the embodiments.

Figure 19A:
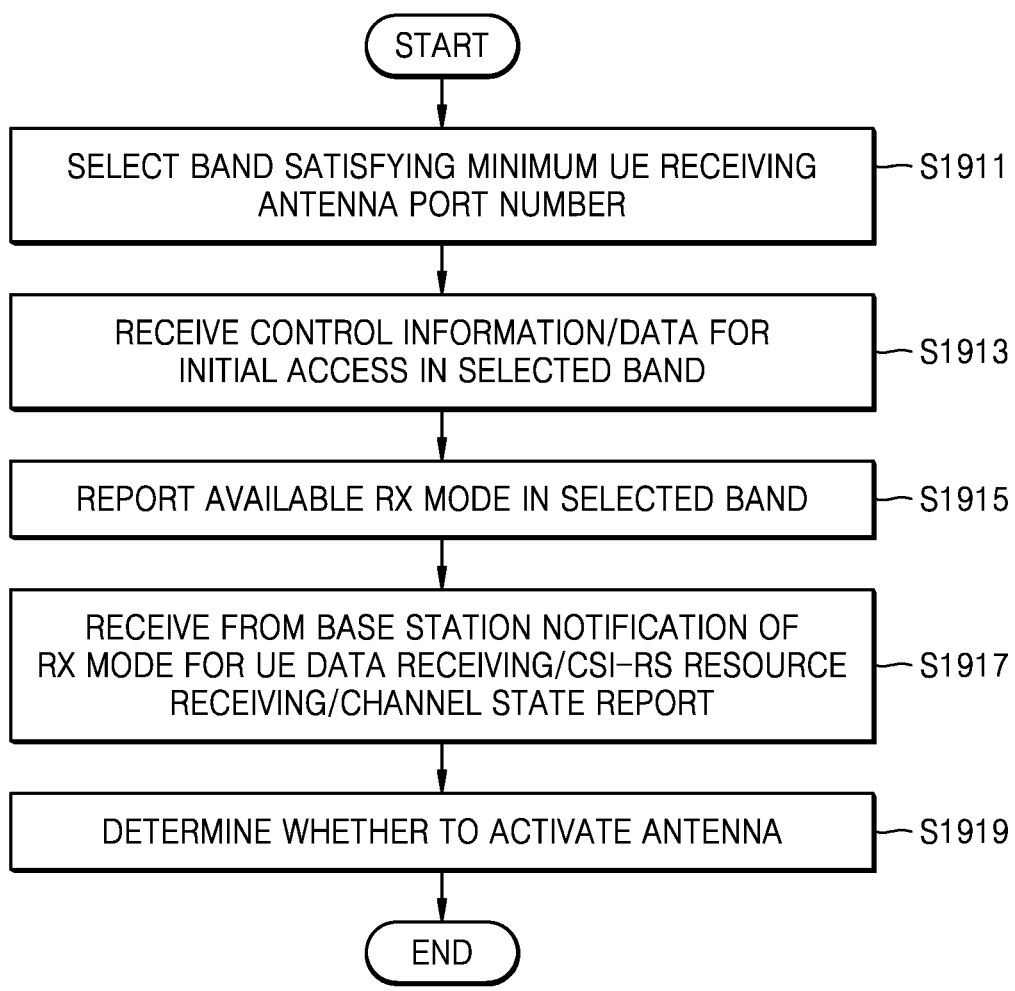
FIGS. 19A to 19D are views of an example of an operation between a base station and a UE, according to a combination of embodiments of the disclosure.

FIG. 19A is a view of an operation according to a first example combined with the first embodiment and the second-1 to second-4 embodiments. In the first example, a UE receiving band may be selected, and an Rx mode report operation may be performed.

In operation S1911, the UE may select a band satisfying a minimum UE receiving antenna number condition.

In operation S1913, the UE may receive control information and data at an initial access from the selected band.

In detail, the UE may use only a band satisfying the minimum number of UE receiving antenna ports condition according to the first embodiment, as a band for receiving control information and data from the base station at the initial access.

In operation S1915, the UE may report whether a receiving antenna port deactivation/activation state (hereinafter, the Rx mode) of a band used through the first embodiment is changeable, according to the second embodiment.

In operation S1917, the base station may configure the Rx mode for UE data receiving and the Rx mode for receiving a CSI-RS resource or a channel state report, based on whether the Rx mode reported by the UE is changeable, and then notify the configuration as a band used through the first embodiment.

In operation S1919, the UE may determine whether to activate an antenna based on the Rx mode.

A combination of configuration methods of Rx modes for data, CSI-RS, and a channel state report may include the following second, third, and fourth examples.

Figure 19B:
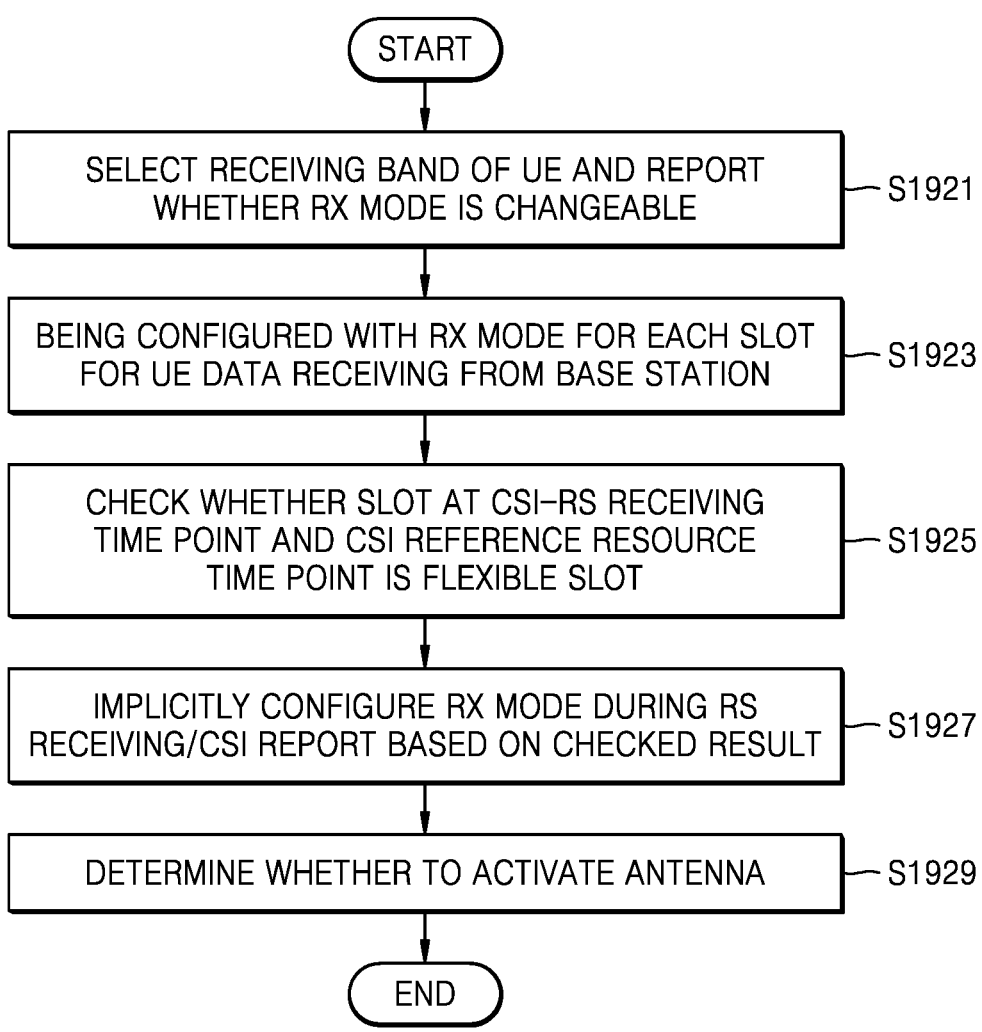

FIG. 19B is a view of an operation according to a second example of combining the third-4, fifth-1, fifth-2, and fifth-4 embodiments.

In the second example, the Rx mode for receiving data for each slot may be configured, and the implicit Rx mode for receiving a CSI-RS resource may be configured.

In the second example of FIG. 19B, after the UE receiving band selection and Rx mode report are performed according to the first example of FIG. 19A, the base station may configure a UE Rx mode for each slot according to the third-4 embodiment, and the Rx mode for CSI-RS resource receiving or reporting channel state information is implicitly configured according to the fifth-1 or fifth-4 embodiment.

In operation S1921, the UE may select a receiving band, and report whether the Rx mode is changeable in the selected band.

In operation S1923, according to the third-4 embodiment, the UE may be configured with Rx mode for each slot for UE data receiving from the base station.

In operation S1925, the UE may identify whether a slot at least one time point of the CSI-RS receiving time point and the CSI reference resource time point is a flexible slot.

In operation S1927, the UE may implicitly configure the Rx mode during the RS receiving/CSI report based on the identified result.

When the identified slot is a flexible slot, the UE may implicitly configure the Rx mode during the RS receiving/CSI report according to the fifth-2 embodiment.

In detail, when a CSI-RS resource is received in the flexible slot or the UE reports channel state information corresponding to the CSI reference resource in the slot, the Rx mode for receiving a CSI-RS resource/reporting channel state information may be configured according to the fifth-2 embodiment.

When the checked slot is not a flexible slot, the UE may implicitly configure the Rx mode during the RS receiving/CSI report, according to the fifth-1 or fifth-4 embodiment.

In operation S1929, the UE may determine whether to activate an antenna based on the Rx mode.

When the base station and the UE are configured according to the second example, as the channel state information framework does not need to be independently configured for each different Rx mode, an overhead for the channel state information framework configuration and notification is lower than other examples. In the second example, the Rx mode for UE data receiving may be indicated through higher layer signaling, except for a specific slot.

Figure 19C:
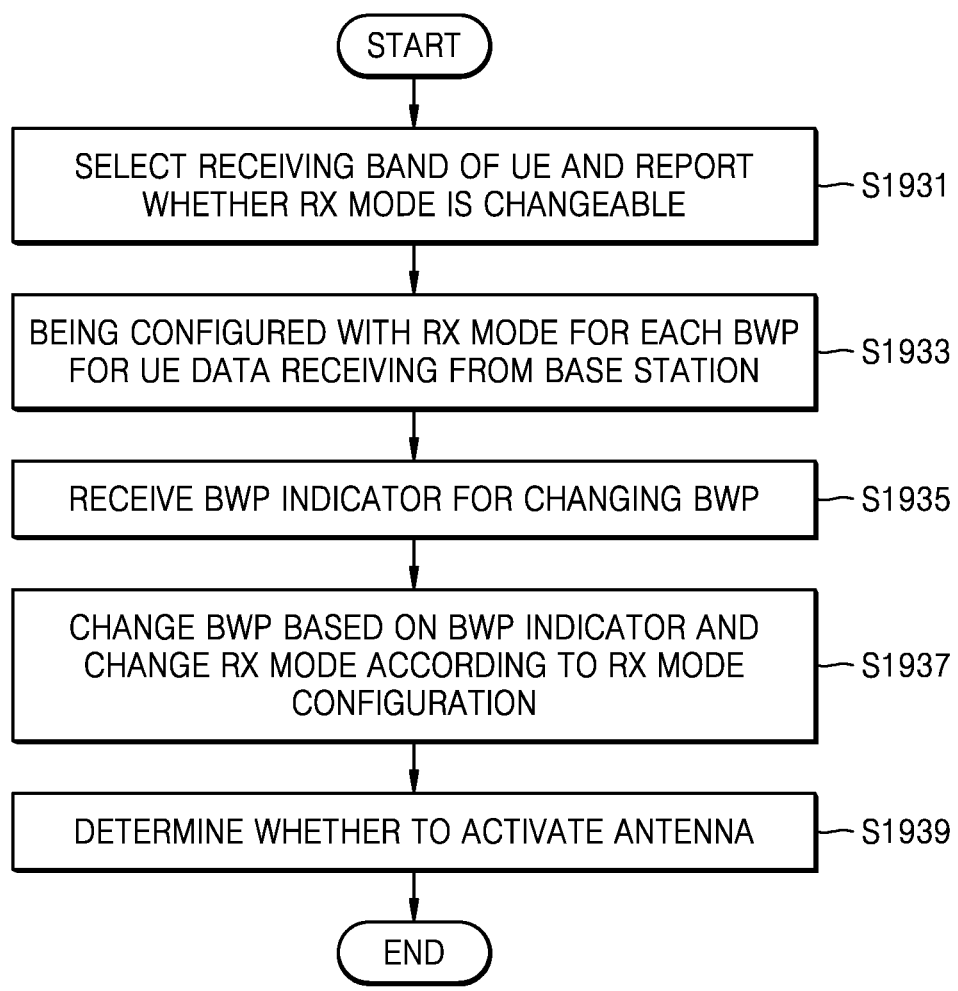

FIG. 19C is a view of an operation according to a third example of combining the third-3 embodiment and the fifth-3 embodiment.

In the third example, an Rx mode for each BWP for receiving data may be configured, and a CSI framework for each BWP may be configured.

In operation S1931, the UE may select a receiving band, and report whether the Rx mode is changeable in the selected band. The base station may implicitly configure the Rx mode for CSI-RS resource receiving and channel state information, according to the fifth-3 embodiment.

In operation S1933, the UE may be configured with the Rx mode for each BWP for UE data receiving from the base station. In detail, the base station may determine the Rx mode for UE data receiving based on the channel state report reported by the UE according to the configured channel state information framework, and then notify the Rx mode to the UE. After the UE receiving band selection and Rx mode report are performed according to the first example, the base station may configure the Rx mode for UE data receiving for each BWP according to the third-3 embodiment.

In operation S1935, the UE may receive from the base station a BWP indicator for changing the BWP.

In operation S1937, the UE may change the BWP based on the BWP indicator, and change the Rx mode according to the Rx mode configuration.

In operation S1939, the UE may determine whether to activate an antenna, based on the Rx mode.

When the base station and the UE are configured according to the example, the Rx mode for UE data receiving may be notified via the BWP indicator that is already supported in the current 5G NR standard, and thus no additional overhead for the Rx mode change notification is unnecessary. For the UE data receiving and CSI-RS resource receiving, a different BWP may be necessary for each Rx mode.

Figure 19D:
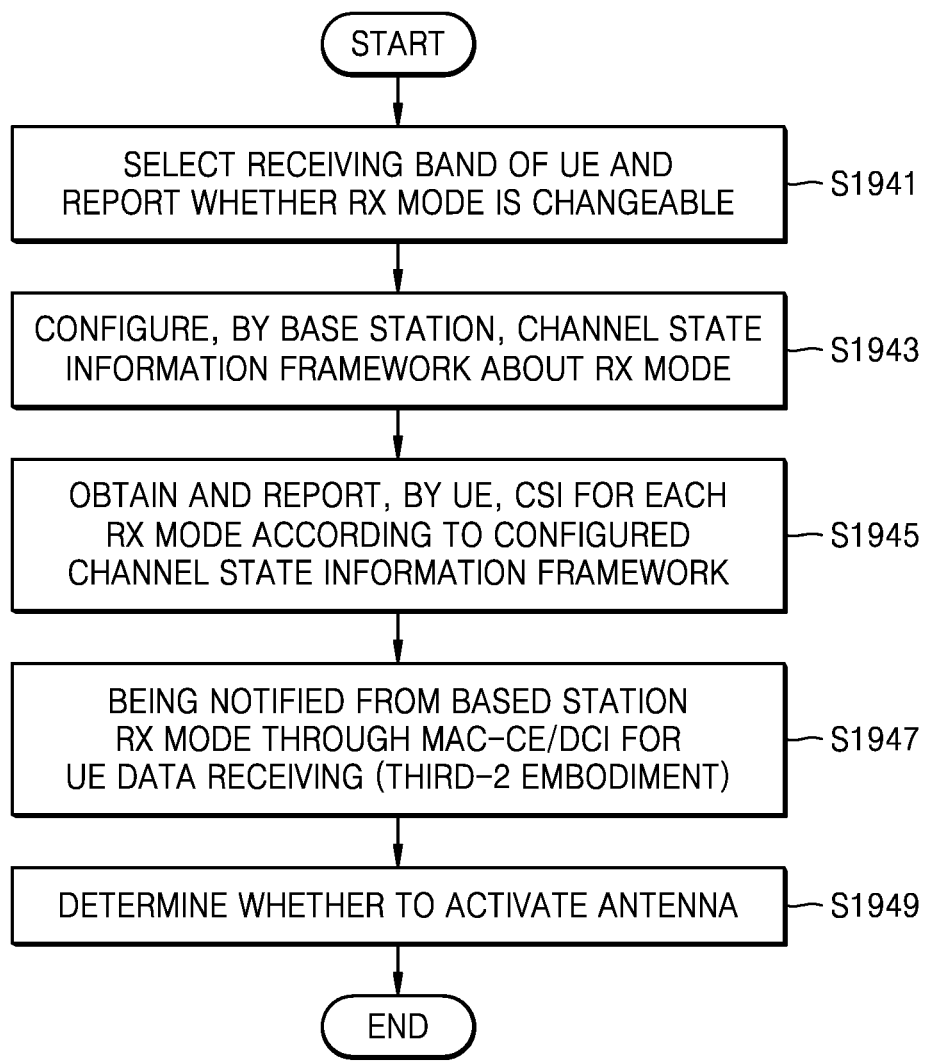

FIG. 19D is a view of an operation according to a fourth example of combining the third-2 embodiment and the fourth embodiment.

In the fourth example, MAC-CE/DCI of the Rx mode for receiving data may be notified and may be configured for each Rx mode of a CSI framework.

In operation S1941, the UE may select a receiving band, and report whether the Rx mode is changeable in the selected band.

In operation S1943, the base station may configure the channel state information framework about the Rx mode.

In operation S1945, the UE may obtain and report CSI for each Rx mode according to the configured channel state information framework.

In operation S1947, the UE may be notified from the based station the Rx mode through MAC-CE/DCI for UE data receiving.

Third-2 Embodiment

In operation S1949, the UE may determine whether to activate an antenna based on the Rx mode.

In the fourth example of FIG. 19D, the UE may select a receiving band, and perform an Rx mode report according to the first example. The base station may determine the Rx mode for UE data receiving according to the third-2 embodiment and notify through MAC-CE/DCI.

An example in which the Rx mode for receiving a CSI-RS resource and reporting channel state information is explicitly configured according to the fourth embodiment is shown. The base station may determine the UE Rx mode based on a channel state information report result for each configured Rx mode (19-35), and then notify the Rx mode. When the base station and the UE are configured according to the example, it is advantageous that the Rx mode may be freely changed compared with the second example, and that additional frequency resource is not necessary for each Rx mode compared with the third example The first embodiment regarding the band selection and the second embodiment regarding the UE capability report may be operated according to each of the third, fourth, and fifth embodiments and all combinations of the third, fourth, and fifth embodiments. The combination of the above-described embodiments is merely exemplary, and the base station and the UE may employ a combination with another embodiment as necessary.

Figure 20:
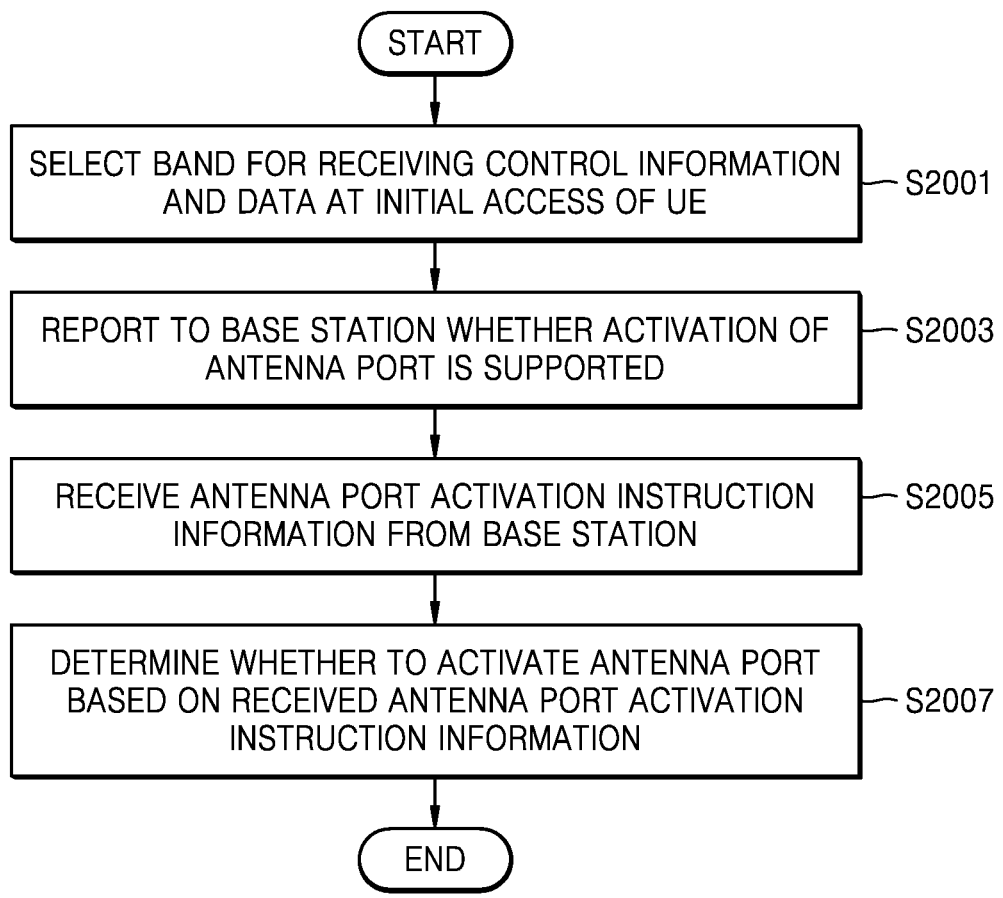
FIG. 20 is a flowchart of an operation of a UE, according to an embodiment of the disclosure.

FIG. 20 is a flowchart of an operation of the UE according to an embodiment of the disclosure.

In operation S2001, the UE may select a band for receiving control information and data at the initial access.

According to an embodiment of the disclosure, the operation of selecting a band for receiving control information/data at the initial access may include an operation of performing, by the UE, an initial access such as frequency tuning, SSB receiving, and the like only on a band satisfying the minimum number of UE receiving antenna ports condition for each band.

In operation S2003, the UE may report, to the base station, whether the activation of an antenna port is supported.

According to an embodiment of the disclosure, the operation of reporting to the base station whether the activation of the antenna port is supported may include an operation of reporting, by the UE, a UE capability report including information about the maximum layer number of PDSCHs that is receivable by the UE, to the base station.

According to an embodiment of the disclosure, the operation of reporting to the base station whether the activation of the antenna port is supported may include an operation of reporting to the base station whether a switching operation between a plurality of antenna port activation modes.

According to an embodiment of the disclosure, the operation of reporting to the base station whether the activation of the antenna port is supported may include an operation of reporting to the base station the number of antenna ports to be activated through a bitmap.

According to an embodiment of the disclosure, the operation of reporting to the base station whether the activation of the antenna port is supported may include an operation of reporting to the base station whether a switching operation from a first activation mode in which a certain number of the antenna ports are activated to a second activation mode in which a different number of the antenna ports from the certain number of the antenna ports are activated is supported.

According to an embodiment of the disclosure, the operation of reporting to the base station whether the activation of the antenna port is supported may include an operation of reporting to the base station whether an antenna port supports the activation/deactivation switching, through the bitmap.

In operation S2005, the UE may receive antenna port activation indication information from the base station.

According to an embodiment of the disclosure, the operation of receiving the antenna port activation indication information from the base station may include an operation of receiving the antenna port activation indication information from the base station through higher layer signaling.

According to an embodiment of the disclosure, the operation of receiving the antenna port activation indication information from the base station may include an operation of receiving the antenna port activation indication information from the base station MAC CE and DCI.

According to an embodiment of the disclosure, the operation of receiving the antenna port activation indication information from the base station may include an operation of receiving the antenna port activation indication information from the base station, for each bandwidth of the UE.

According to an embodiment of the disclosure, the operation of receiving the antenna port activation indication information from the base station may include an operation of receiving the antenna port activation indication information for each UE slot from the base station.

According to an embodiment of the disclosure, a UE operation method may further include an operation of receiving an indication regarding an antenna port activation mode for measuring a channel state, an operation of measuring a channel state in the indicated antenna port activation mode, and an operation of reporting a measured channel state to the base station.

According to an embodiment of the disclosure, the operation of receiving an indication regarding an antenna port activation mode for measuring a channel state may include an operation of receiving an indication from the base station regarding an antenna port activation mode for measuring a channel state based on a CSI-RS resource set including at least one of CSI-RS resources respectively matched with at least one of transmitting/receiving beams.

According to an embodiment of the disclosure, the operation of receiving an indication regarding an antenna port activation mode for measuring a channel state may include an operation of receiving an indication from the base station regarding an antenna port activation mode for measuring a channel state based on at least one CSI-RS resource including information about a reference signal.

According to an embodiment of the disclosure, the operation of receiving an indication regarding an antenna port activation mode for measuring a channel state may include an operation of receiving an indication from the base station regarding an antenna port activation mode for measuring a channel state based on a CSI resource setting including at least one CSI-RS resource set.

According to an embodiment of the disclosure, the operation of receiving an indication regarding an antenna port activation mode for measuring a channel state may include an operation of receiving an indication from the base station regarding an antenna port activation mode for measuring based on a CSI report setting including information about a channel state based on a CSI reporting method.

According to an embodiment of the disclosure, the operation of receiving an indication regarding an antenna port activation mode for measuring a channel state may include an operation of receiving an indication from the base station regarding an antenna port activation mode for measuring a channel state based on whether the activation of the antenna port is supported and the transmission characteristics of a reference signal including in at least one of the CSI resource setting and the CSI report setting.

According to an embodiment of the disclosure, the operation of receiving the antenna port activation indication information from the base station may include an operation of receiving the antenna port activation indication information from the base station based on a CSI report setting triggered according to a CSI request field mapped to a trigger state.

According to an embodiment of the disclosure, the UE operation method may further include an operation of measuring channel state information based on an antenna port activation mode at the time point of receiving CSI-RS from the base station and an operation of reporting, to the base station, the measured channel state information and activation/deactivation configuration information of antenna port on which the channel state information is measured.

According to an embodiment of the disclosure, the UE operation method may further include an operation of changing the activation mode of an antenna port to a certain first activation mode before receiving the CSI-RS from the base station, an operation of measuring channel state information of each of at least one of activation modes based on the certain first activation mode when receiving the CSI-RS from the base station, and an operation of reporting the measured channel state information to the base station.

In operation S2007, the UE may determine whether to activate the antenna port based on the received antenna port activation indication information.

The above-described operations S2003 to S2007 may be performed through a processor included in the UE.

According to an embodiment of the disclosure, as the whole or some of UE antennas are dynamically deactivated or activated, UE power consumption may be reduced and energy efficiency may be improved.

According to an embodiment of the disclosure, in the determining of whether to activate each of the UE antennas, UE antenna capability, a channel state between the base station and the UE (channel state information (CSI)), UE power amount, and the like may be taken into consideration.

According to an embodiment of the disclosure, the UE may report one or more of the above-described elements to the base station, and the base station may determine whether to activate the UE antenna based on the information reported by the UE and the information that the base station already knows.

According to an embodiment of the disclosure, the base station may explicitly transmit a UE antenna activation signal to the UE through a downlink control channel. Alternatively, the base station may implicitly notify the UE of UE antenna activation information by a method such as a component carrier, frequency and time resource allocation, and the like.

Figure 21:
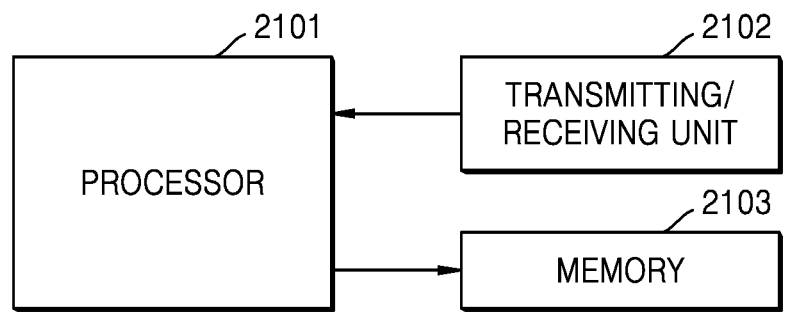
FIG. 21 is a view of a structure of a UE, according to an embodiment of the disclosure.

FIG. 21 is a view of a structure of the UE according to an embodiment of the disclosure.

Referring to FIG. 21, the UE may include a processor 2101, a transmitting/receiving unit 2102, and a memory 2103. In the disclosure, a processor may be defined to be a circuit, an application specific integrated circuit, or at least one processor.

According to an embodiment of the disclosure, the processor 2101 may control the overall operation of the UE. For example, the processor 2101 may control the flow of signals between blocks to perform an operation according to the above-described flowchart. Furthermore, the processor 2101 may write or read data to or from the memory 2103. The processor 2101 may perform functions of a protocol stack required from the communication standards. To this end, the processor 2101 may include at least one processor or microprocessor, or the processor 2101 may be a part of the processor. Furthermore, a part of the transmitting/receiving unit 2102 and the processor 2101 may be referred to as a communication processor (CP).

According to an embodiment of the disclosure, the processor 2101 may control the operations of the UEs described with reference to FIGS. 1 to 20.

According to an embodiment of the disclosure, the processor 2101 may report, to the base station, whether the activation of an antenna port is supported, receive antenna activation indication information from the base station, and determine whether to activate the antenna based on the received antenna activation indication information, by performing a program stored in the memory 2103.

According to an embodiment of the disclosure, the transmitting/receiving unit 2102 may perform functions of transmitting/receiving a signal through a wireless channel.

For example, the transmitting/receiving unit 2102 may perform a function of switching between a baseband signal and a bit string function, according to a physical layer standard of a system. For example, during data transmitting, the transmitting/receiving unit 2102 may generate complex symbols by coding and modulating a transmitted bit string. Furthermore, during data receiving, the transmitting/receiving unit 2102 may reconstruct a received bit string by demodulating and decoding the baseband signal. Furthermore, the transmitting/receiving unit 2102 may upconvert the baseband signal to an RF band signal and then transmit the upconverted signal via an antenna, and may downconvert an RF band signal received via the antenna to a baseband signal. For example, the transmitting/receiving unit 2102 may include a transmission filter, a receiving filter, an amplifier, a mixer, an oscillator, a DAC, an ADC, and the like. Furthermore, the transmitting/receiving unit 2102 may include a plurality of transmission/receiving paths. Furthermore, the transmitting/receiving unit 2102 may include at least one antenna array consisting of a plurality of antenna components. In terms of hardware, the transmitting/receiving unit 2102 may include a digital circuit and an analog circuit, for example, a radio frequency integrated circuit (RFIC). The digital circuit and analog circuit may be implemented in one package. Furthermore, the transmitting/receiving unit 2102 may include a plurality of RF chains.

The transmitting/receiving unit 2102 may transmit/receive signals with the base station. The signal may include control information and data. To this end, the transmitting/receiving unit 2102 may include an RF transmitter for upconverting and amplifying the frequency of a signal being transmitted, an RF receiver for low-noise amplifying a received signal and downconverting the frequency of the signal, and the like. However, this is merely an embodiment of the transmitting/receiving unit 2102, and the constituent elements of the transmitting/receiving unit 2102 are not limited to the RF transmitter and the RF receiver.

Furthermore, the transmitting/receiving unit 2102 may receive a signal through a wireless channel and output the signal to the processor 2001, and may transmit a signal output from the processor 2101 through the wireless channel.

According to an embodiment of the disclosure, the memory 2103 may store data such as basic programs for the operation of a UE, application programs, configuration information, and the like. The memory 2103 may include a volatile memory, a non-volatile memory, or a combination of a volatile memory and a non-volatile memory. The memory 2103 may provide data stored at a request of the processor 2101. The memory 2103 may store at least one of the information transmitted/received by the transmitting/receiving unit 2102 and information generated by the processor 2101.

Figure 22:
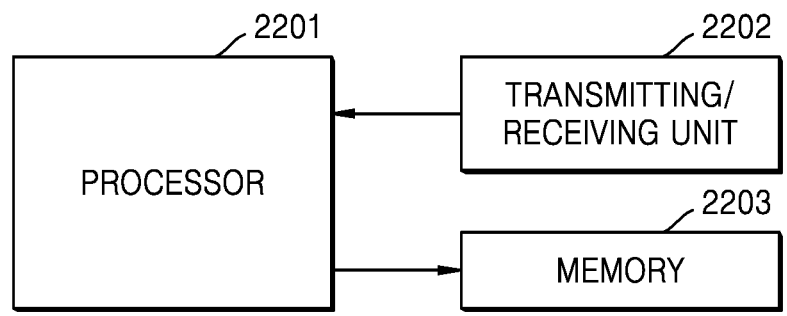
FIG. 22 is a view of a structure of a base station, according to an embodiment of the disclosure.

FIG. 22 is a view of a structure of the base station according to an embodiment of the disclosure.

Referring to FIG. 22, the base station may include a processor 2201, a transmitting/receiving unit 2202, and a memory 2203. In the disclosure, a processor may be defined to be a circuit, an application specific integrated circuit, or at least one processor.

According to an embodiment of the disclosure, the processor 2201 may control the overall operation of the base station. For example, the processor 2201 may control the flow of signals between blocks to perform an operation according to the above-described flowchart. Furthermore, the processor 2201 may write or read data to or from the memory 2203. The processor 2201 may perform functions of a protocol stack required from the communication standards. To this end, the processor 2201 may include at least one processor or microprocessor, or the processor 2201 may be a part of the processor. Furthermore, a part of the transmitting/receiving unit 2202 and the processor 2201 may be referred to as a communication processor (CP).

According to an embodiment of the disclosure, the processor 2201 may control the operations of the base stations described with reference to FIGS. 1 to 20.

According to an embodiment of the disclosure, the processor 2201 may control a series of processes to operate the base station according to the above-described embodiment of the disclosure.

According to an embodiment of the disclosure, the processor 2201 may select a band for receiving control information and data at the initial access of the UE, receive a report from the UE regarding whether the activation of an antenna port is supported, and transmit antenna activation indication information to the UE based on the reported antenna activation support, by performing the program stored in the memory 2203.

According to an embodiment of the disclosure, the transmitting/receiving unit 2202 may perform functions of transmitting/receiving a signal through a wireless channel. For example, the transmitting/receiving unit 2202 may perform a function of switching between a baseband signal and a bit string function, according to a physical layer standard of a system. For example, during data transmitting, the transmitting/receiving unit 2202 may generate complex symbols by coding and modulating a transmitted bit string. Furthermore, during data receiving, the transmitting/receiving unit 2202 may reconstruct a received bit string by demodulating and decoding the baseband signal. Furthermore, the transmitting/receiving unit 2202 may upconvert the baseband signal to an RF band signal and then transmit the upconverted signal via an antenna, and may downconvert an RF band signal received via the antenna to a baseband signal. For example, the transmitting/receiving unit 2202 may include a transmission filter, a receiving filter, an amplifier, a mixer, an oscillator, a DAC, an ADC, and the like. Furthermore, the transmitting/receiving unit 2202 may include a plurality of transmission/receiving paths. Furthermore, the transmitting/receiving unit 2202 may include at least one antenna array consisting of a plurality of antenna components. In terms of hardware, the transmitting/receiving unit 2202 may include a digital circuit and an analog circuit, for example, a radio frequency integrated circuit (RFIC). The digital circuit and analog circuit may be implemented in one package. Furthermore, the transmitting/receiving unit 2202 may include a plurality of RF chains.

The transmitting/receiving unit 2202 may transmit/receive signals with the base station. The signal may include control information and data. To this end, the transmitting/receiving unit 2202 may include an RF transmitter for upconverting and amplifying the frequency of a signal being transmitted, an RF receiver for low-noise amplifying a received signal and downconverting the frequency of the signal, and the like. However, this is merely an embodiment of the transmitting/receiving unit 2202, and the constituent elements of the transmitting/receiving unit 2202 are not limited to the RF transmitter and the RF receiver.

Furthermore, the transmitting/receiving unit 2202 may receive a signal through a wireless channel and output the signal to the processor 2201, and may transmit a signal output from the processor 2201 through the wireless channel.

According to an embodiment of the disclosure, the memory 2203 may store data such as basic programs for the operation of a base station, application programs, configuration information, and the like. The memory 2203 may include a volatile memory, a non-volatile memory, or a combination of a volatile memory and a non-volatile memory. The memory 2203 may provide data stored at a request of the processor 2201. The memory 2203 may store at least one of the information transmitted/received by the transmitting/receiving unit 2202 and information generated by the processor 2201.

The methods according to the embodiments set forth in the claims or specification of the disclosure may be implemented hardware, software, or a combination of hardware and software.

When the method is implemented by software, a computer-readable storage medium for storing one or more programs (software modules) may be provided. The one or more program stored in a computer-readable storage medium may be configured for execution by one or more processors in an electronic device. The one or more program may include indications that allow an electronic device to execute the methods according to the embodiments set forth in the claims or specification of the disclosure.

The programs (software modules, software) may be stored in a non-volatile memory including a random access memory or a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, or magnetic cassettes. Alternatively, the programs may be stored in a memory consisting of a combination of some or all of the above memories. Furthermore, each constituent memory may include a plurality of memories.

Furthermore, the program may be stored in an attachable storage device that can be accessed through a communication network such as the Internet, an intranet, a local area network (LAN), a wide LAN (WLAN), or a storage area network (SAN), or a communication network consisting of a combination thereof. The storage device may access a device performing an embodiment of the disclosure through an external port. Furthermore, a separate storage device on a communication network may access a device that performs an embodiment of the disclosure.

In above-described detailed embodiments of the disclosure, the constituent elements included in the disclosure may be expressed to be singular or plural according to the presented detailed embodiment. However, the expression of the singular or the plural is chosen appropriate to a situation presented for convenience of explanation, and the disclosure is not limited to a singular constituent element or a plurality of constituent elements, and any constituent element expressed to be plural may be configured to be a singular constituent element, or any constituent element expressed to be singular may be configured to be a plurality of constituent elements.

In the detailed description of the disclosure, a specific embodiment has been described, but it goes without saying that various modifications are possible without departing from the scope of the disclosure. Therefore, the scope of the disclosure should not be limited to the described embodiments, but should be determined by the scope of the claims to be described later as well as those equivalents to the scope of the claims.

The invention claimed is:

1. A method of a user equipment (UE) for controlling an antenna port of the UE in a wireless communication system, the method comprising:
    selecting a band for receiving control information and data among a plurality of bands, wherein a number of receiving antenna ports of the UE is greater than or equal to a minimum required number of receiving antenna ports configured for the band;
    transmitting, to a base station, UE capability information indicating whether the UE supports activation and deactivation of the receiving antenna ports of the UE for the selected band;
    receiving antenna port activation indication information from the base station, in response to the UE capability information, wherein the antenna port activation indication information indicates an Rx mode per bandwidth part (BWP) in the selected band, the Rx mode indicating states of the activation and deactivation of the receiving antenna ports;
    identifying whether to activate or deactivate at least one of the receiving antenna ports, based on the received antenna port activation indication information;
    receiving an indication of changing BWP used by the UE to a certain BWP via media access control (MAC) control element (CE) or downlink control information (DCI); and
    changing, in response to the indication, an Rx mode from a first Rx mode to a second Rx mode based on the antenna port activation indication information,
    wherein the second Rx mode corresponds to the certain BWP.

2. The method of claim 1, wherein the UE capability information includes information about a maximum number of layers for PDSCHs.

3. The method of claim 1, further comprising:
    receiving an indication regarding an antenna port activation mode for measuring a channel state;
    measuring a channel state in the antenna port activation mode; and
    transmitting the measured channel state to the base station.

4. The method of claim 3, wherein the receiving of the indication regarding the antenna port activation mode for measuring the channel state comprises:
    receiving, from the base station, the indication regarding the antenna port activation mode for measuring the channel state, based on a CSI-RS resource set including at least one CSI-RS resource mapped to at least one transmitting and at least one receiving beam.

5. The method of claim 1, wherein the receiving of the antenna port activation indication information from the base station comprises:
    receiving the antenna port activation indication information from the base station, based on a CSI report setting triggered according to a CSI request field mapped to a trigger state.

6. The method of claim 1, further comprising:
    measuring channel state information based on an antenna port activation mode at a time point when a CSI-RS resource is received from the base station; and
    transmitting, to the base station, the measured channel state information and activation/deactivation configuration information of a receiving antenna port on which the channel state information is measured.

7. A method of a base station for controlling an antenna port of a user equipment (UE) in a wireless communication system, the method comprising:
    receiving, from the UE, UE capability information indicating whether the UE supports activation and deactivation of receiving antenna ports of the UE for a band; and
    transmitting antenna port activation indication information to the UE, based on the UE capability information, wherein the antenna port activation indication information indicates an Rx mode per bandwidth part (BWP) in a selected band, the Rx mode indicating states of the activation and deactivation of the receiving antenna ports; and
    transmitting an indication of changing BWP used by the UE to a certain BWP via media access control (MAC) control element (CE) or downlink control information (DCI), in order to change an Rx mode of the UE from a first Rx mode to a second Rx mode,
    wherein the second Rx mode corresponds to the certain BWP.

8. The method of claim 7, wherein the UE capability information includes information about a maximum number of layers for PDSCHs.

9. The method of claim 7, further comprising:
    indicating the UE regarding an antenna port activation mode for measuring a channel state; and
    receiving a report of the measured channel state from the UE.

10. The method of claim 9, wherein the indicating of the UE regarding the antenna port activation mode for measuring the channel state comprises:
  indicating the UE regarding the antenna port activation mode for measuring the channel state, based on a CSI-RS resource set including at least one CSI-RS resource mapped to at least one transmitting/receiving beam.

11. The method of claim 7, wherein the transmitting of the antenna port activation indication information to the UE comprises:
  indicating the UE regarding the antenna port activation indication information, based on a CSI report setting triggered according to a CSI request field mapped to a trigger state.

12. A user equipment (UE) for controlling an antenna port of the UE in a wireless communication system, the UE comprising:
  a transmitting/receiving unit;
  a memory storing a program; and
  a processor configured to: by executing the program,
  select a band for receiving control information and data among a plurality of bands, wherein a number of receiving antenna ports of the UE is greater than or equal to a minimum required number of receiving antenna ports configured for the band;
  transmit, to a base station, UE capability information indicating whether the UE supports activation and deactivation of the receiving antenna ports of the UE for the selected band;
  receive antenna port activation indication information from the base station, in response to the UE capability information, wherein the antenna port activation indication information indicates an Rx mode per bandwidth part (BWP) in the selected band, the Rx mode indicating states of the activation and deactivation of the receiving antenna ports;
  identify whether to activate or deactivate at least one of the receiving antenna ports to semi-static or dynamic, based on the received antenna port activation indication information;
  receive an indication of changing BWP used by the UE to a certain BWP via media access control (MAC) control element (CE) or downlink control information (DCI); and
  change, in response to the indication, an Rx mode from a first Rx mode to a second Rx mode based on the antenna port activation indication information,
  wherein the second Rx mode corresponds to the certain BWP.

13. The UE of claim 12, wherein the UE capability information includes information about a maximum number of layers for PDSCHs.

14. The UE of claim 12, wherein the processor further configured to:
  receive an indication regarding an antenna port activation mode for measuring a channel state,
  measure a channel state in the antenna port activation mode, and
  report the measured channel state to the base station.

15. The UE of claim 12, wherein the processor further configured to:
  receive the antenna port activation indication information from the base station, based on a CSI report setting triggered according to a CSI request field mapped to a trigger state.

16. The UE of claim 12, wherein the processor further configured to:
  measure channel state information based on an antenna port activation mode at a time point when a CSI-RS resource is received from the base station, and
  report, to the base station, the measured channel state information and activation/deactivation configuration information of a receiving antenna port on which the channel state information is measured.

17. A base station for controlling an antenna port of a user equipment (UE) in a wireless communication system, the base station comprising:
  a transmitting/receiving unit;
  a memory storing a program; and
  a processor configured to: by executing the program,
  receive, from the UE, UE capability information indicating whether the UE supports activation and deactivation of receiving antenna ports of the UE for a band; and
  transmit antenna port activation indication information to the UE, based on the UE capability information, wherein the antenna port activation indication information indicates an Rx mode per bandwidth part (BWP) in a selected band, the Rx mode indicating states of the activation and deactivation of the receiving antenna ports; and
  transmitting an indication of changing BWP used by the UE to a certain BWP via media access control (MAC) control element (CE) or downlink control information (DCI), in order to change an Rx mode of the UE from a first Rx mode to a second Rx mode,
  wherein the second Rx mode corresponds to the certain BWP.

* * * * *